United States Patent
Maeda et al.

(10) Patent No.: US 10,696,843 B2
(45) Date of Patent: *Jun. 30, 2020

(54) POLYPHENYLENE ETHER FLAME-RETARDANT RESIN COMPOSITION

(71) Applicant: ASAHI KASEI KABUSHIKI KAISHA, Chiyoda-ku, Tokyo (JP)

(72) Inventors: Chihiro Maeda, Tokyo (JP); Mihoko Yamamoto, Tokyo (JP); Akira Mitsui, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 15/772,610

(22) PCT Filed: Oct. 3, 2016

(86) PCT No.: PCT/JP2016/004460
§ 371 (c)(1),
(2) Date: May 1, 2018

(87) PCT Pub. No.: WO2017/077683
PCT Pub. Date: May 11, 2017

(65) Prior Publication Data
US 2019/0119492 A1   Apr. 25, 2019

(30) Foreign Application Priority Data

Nov. 6, 2015 (JP) ................................ 2015-218620
Jun. 2, 2016 (JP) ................................ 2016-111215

(51) Int. Cl.
| C08L 71/12 | (2006.01) |
| C08G 65/48 | (2006.01) |
| C08G 65/44 | (2006.01) |
| C08K 5/50 | (2006.01) |
| C08K 5/521 | (2006.01) |
| C08K 5/527 | (2006.01) |
| C08K 5/5313 | (2006.01) |

(52) U.S. Cl.
CPC ............ C08L 71/126 (2013.01); C08G 65/44 (2013.01); C08G 65/48 (2013.01); C08G 65/485 (2013.01); C08K 5/50 (2013.01); C08K 5/521 (2013.01); C08K 5/527 (2013.01); C08K 5/5313 (2013.01); C08L 71/12 (2013.01); C08L 2201/02 (2013.01); C08L 2201/08 (2013.01)

(58) Field of Classification Search
CPC ....... C08G 65/48; C08G 65/44; C08L 71/126; C08K 5/5313; C08K 5/50; C08K 5/0066
USPC ...................................................... 524/120
See application file for complete search history.

(56) References Cited

U.S. PATENT DOCUMENTS

| 4,837,276 A | 6/1989 | Fuhr et al. |
| 2005/0075472 A1* | 4/2005 | Yeager .................. C08F 283/06 528/86 |
| 2006/0106139 A1 | 5/2006 | Kosaka et al. |
| 2010/0139944 A1* | 6/2010 | Guo ........................ C08L 71/12 174/110 SR |
| 2010/0292376 A1* | 11/2010 | Timberlake .......... C08K 5/5397 524/129 |
| 2015/0166788 A1 | 6/2015 | Li et al. |

FOREIGN PATENT DOCUMENTS

| CN | 101107317 A | 1/2008 |
| CN | 103709717 A | 4/2014 |
| JP | S63186734 A | 8/1988 |
| JP | H02274761 A | 11/1990 |
| JP | H03292363 A | 12/1991 |
| JP | H0488018 A | 3/1992 |
| JP | H04145157 A | 5/1992 |
| JP | H09176304 A | 7/1997 |
| JP | H09176305 A | 7/1997 |
| JP | 2925646 B2 | 7/1999 |
| JP | 2005225913 A | 8/2005 |
| JP | 2007507586 A | 3/2007 |
| JP | 2009221387 A | 10/2009 |
| JP | 2012153832 A | 8/2012 |
| JP | 2012251039 A | 12/2012 |

(Continued)

OTHER PUBLICATIONS

Ching Hsuan Lin et al., Catalyst-free synthesis of phosphinated poly(2,6-dimethyl-1,4-phenylene oxide) with high-Tg and low-dielectric characteristic, Polymer Degradation and Stability, 2014, pp. 105-110, vol. 99.
May 8, 2018, International Preliminary Report on Patentability issued in the International Patent Application No. PCT/JP2016/004460.
Nov. 22, 2016, International Search Report issued in the International Patent Application No. PCT/JP2016/004460.
Feb. 26, 2019, the Supplementary European Search Report issued by the European Patent Office in the corresponding European Patent Application No. 16883523.9.

(Continued)

*Primary Examiner* — Doris L Lee
(74) *Attorney, Agent, or Firm* — Kenja IP Law PC

(57) ABSTRACT

Provided is a polyphenylene ether flame-retardant resin composition having excellent flame retardance and long-term flame retardance. The flame-retardant resin composition contains: (A) a resin including (A-1) a polyphenylene ether; and (B) a flame retardant. The (A-1) component has a content of 50 mass % or more when the flame-retardant resin composition minus ash content, corresponding to a residue obtained upon burning of the flame-retardant resin composition, is taken to be 100 mass %. A shaped article of 12.6 cm in length, 1.3 cm in width, and 1.6 mm in thickness formed from the flame-retardant resin composition exhibits a rate of change of chloroform-insoluble content of 15 mass % or less through aging in which the shaped article is left for 1,000 hours at 150° C. in an atmospheric air.

19 Claims, No Drawings

(56) References Cited

FOREIGN PATENT DOCUMENTS

| JP | 2013023517 A | 2/2013 |
| JP | 5704936 B2 | 4/2015 |
| JP | 2016176072 A | 10/2016 |

OTHER PUBLICATIONS

Database CA [Online] Chemical Abstracts Service, Columbus, Ohio, US; Kitai, Yuki et al: "Poly (phenylene ether) resin compositions with good fire resistance and dielectric properties and varnishes therefrom", XP002788399, retrieved from STN Database accession No. 2013:175762, 2013.

Jul. 10, 2018, International Preliminary Report on Patentability issued in the International Patent Application No. PCT/JP2016/004461.

Jul. 24, 2018, the Supplementary European Search Report issued by the European Patent Office in the corresponding European Patent Application No. 16861761.1.

* cited by examiner

POLYPHENYLENE ETHER FLAME-RETARDANT RESIN COMPOSITION

TECHNICAL FIELD

This disclosure relates to a polyphenylene ether flame-retardant resin composition.

BACKGROUND

Polyphenylene ether (hereinafter, also referred to as "PPE") resin compositions based on polyphenylene ether resins have features such as heat resistance, electrical properties, dimensional stability, impact resistance, and low specific gravity. Moreover, since it is possible to provide polyphenylene ether resin compositions with flame retardance without the need to use halogen-containing compounds and antimony compounds that have a high environmental burden, polyphenylene ether resin compositions are used in a wide range of applications such as various electric and electronic components, office equipment components, automotive components, building materials, and other exterior materials and industrial goods.

In recent years, progress toward more compact and higher performance components has resulted in demand for favorable long-term properties in addition to short-term properties. Consequently, there is demand for a polyphenylene ether resin composition to maintain mechanical strength and flame retardance even upon long-term exposure to a high-temperature environment.

Examples of methods for increasing thermal stability of polyphenylene ethers that have been developed up until the present time include a technique of including a specific hydrogenated block copolymer and a specific flame retardant in a specific composition and adopting a specific production method (refer to PTL 1), and a technique of polyphenylene ether terminal stabilization through addition of a vinyl compound (refer to PTL 2).

CITATION LIST

Patent Literature

PTL 1: JP 5704936 B
PTL 2: JP 2925646 B

SUMMARY

Technical Problem

However, the inventors discovered that in a case in which a high polyphenylene ether content (for example, 50 mass % or more) is adopted in a PPE resin composition in order to increase heat resistance, although the PPE resin composition has excellent aging properties at low temperature or in the short-term, the PPE resin composition suffers from a problem of significant reduction in both mechanical properties and flame retardance upon aging at high temperature for a long time, such as at 150° C. for 1,000 hours.

Therefore, an objective of this disclosure is to provide a polyphenylene ether flame-retardant resin composition that has excellent flame retardance and long-term flame retardance (for example, flame retardance after long-term heat aging at 150° C. for 1,000 hours) while maintaining high heat resistance.

Solution to Problem

As a result of diligent studies conducted with the aim of solving the problems set forth above, the inventors discovered that these problems can be solved through inclusion of PPE in at least a specific proportion in a flame-retardant resin composition and by setting a rate of change of chloroform-insoluble content of the flame-retardant resin composition through aging as not more than a specific value, and thereby completed this disclosure.

Specifically, this disclosure provides the following.

[1] A flame-retardant resin composition comprising:
(A) a resin including (A-1) a polyphenylene ether; and
(B) a flame retardant, wherein
the (A-1) component has a content of 50 mass % or more when the flame-retardant resin composition minus ash content, corresponding to a residue obtained upon burning of the flame-retardant resin composition, is taken to be 100 mass %, and
a shaped article of 12.6 cm in length, 1.3 cm in width, and 1.6 mm in thickness that is formed from the flame-retardant resin composition exhibits a rate of change of chloroform-insoluble content of 15 mass % or less through aging in which the shaped article is left for 1,000 hours at 150° C. in an atmospheric air.

[2] The flame-retardant resin composition according to [1], further comprising (C) an antioxidant, wherein
the (C) component has a content of 5.0 parts by mass to 20.0 parts by mass when (A) the resin is taken to be 100 parts by mass.

[3] The flame-retardant resin composition according to [2], wherein
(C) the antioxidant includes a phosphoric antioxidant.

[4] The flame-retardant resin composition according to [1], wherein
(A-1) the polyphenylene ether includes at least one structural unit selected from chemical formulae (1), (2), and (3),

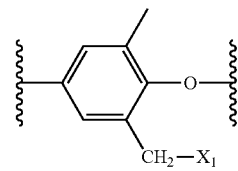

(1)

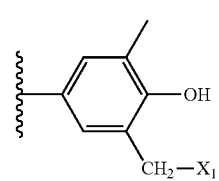

(2)

$X_1$ in chemical formulae (1) and (2) is a group selected from

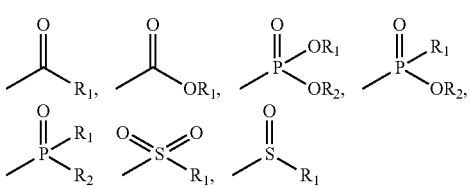

where $R_1$ and $R_2$ in X are each, independently of one another, a substituent having a carbon number of 1 or more,

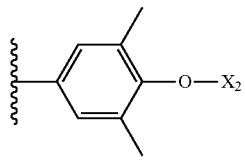

$X_2$ in chemical formula (3) is a group selected from the group consisting of

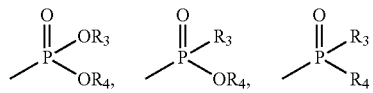

where $R_3$ and $R_4$ in $X_2$ are each, independently of one another, a group selected from the group consisting of a hydrogen atom, an alkyl group, an aryl group, an aminoalkyl group, and an arylamino group, $R_3$ and $R_4$ may form a cyclic structure through bonding of carbon atoms included therein, and chemical formula (3) does not substantially include an unsaturated double bond other than an aromatic ring unsaturated double bond.

[5] The flame-retardant resin composition according to [4], wherein in (A-1) the polyphenylene ether, $X_1$ is a group selected from the group consisting of

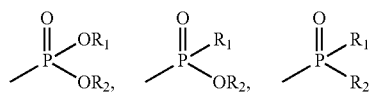

in chemical formulae (1) and (2).

[6] The flame-retardant resin composition according to [4] or [5], wherein 0.01 structural units to 10.0 structural units selected from the group consisting of chemical formulae (1), (2), and (3) are included per 100 monomer units forming (A-1) the polyphenylene ether.

[7] The flame-retardant resin composition according to any one of [4] to [6], wherein a ratio of structural units represented by chemical formula (1) relative to structural units represented by chemical formula (2) is 0 mol % to 30 mol %.

[8] The flame-retardant resin composition according to any one of [4] to [7], wherein (A-1) the polyphenylene ether includes a structural unit represented by chemical formula (3) and either or both of a structural unit represented by chemical formula (1) and a structural unit represented by chemical formula (2).

[9] The flame-retardant resin composition according to any one of [1] and [4] to [8], further comprising (C) an antioxidant, wherein the (C) component has a content of 0.1 parts by mass to 5.0 parts by mass when (A-1) the resin is taken to be 100 parts by mass.

[10] The flame-retardant resin composition according to any one of [1] to [9], wherein (A-1) the polyphenylene ether has a number average molecular weight of 10,000 or more.

[11] A flame-retardant resin composition comprising:
(A) a resin including (A-1) a polyphenylene ether; and
(B) a flame retardant, wherein the (A-1) component has a content of 50 mass % or more when the flame-retardant resin composition minus ash content, corresponding to a residue obtained upon burning of the flame-retardant resin composition, is taken to be 100 mass %, and (A-1) the polyphenylene ether includes at least one structural unit selected from chemical formulae (1), (2), and (3),

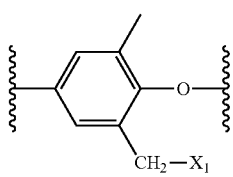

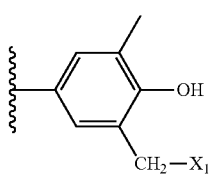

$X_1$ in chemical formulae (1) and (2) is a group selected from

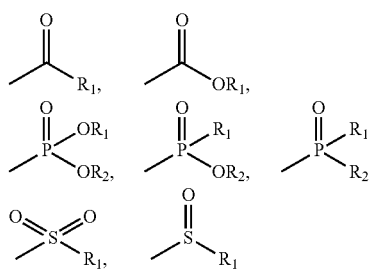

where $R_1$ and $R_2$ in X are each, independently of one another, a substituent having a carbon number of 1 or more,

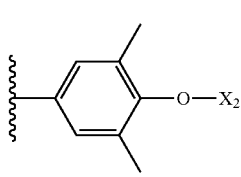

$X_2$ in chemical formula (3) is a group selected from the group consisting of

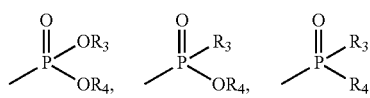

where $R_3$ and $R_4$ in $X_2$ are each, independently of one another, a group selected from the group consisting of a hydrogen atom, an alkyl group, an aryl group, an aminoalkyl group, and an arylamino group, $R_3$ and $R_4$ may form a cyclic structure through bonding of carbon atoms included therein, and chemical formula (3) does not substantially include an unsaturated double bond other than an aromatic ring unsaturated double bond.

Advantageous Effect

According to this disclosure, it is possible to achieve a polyphenylene ether flame-retardant resin composition that has excellent flame retardance and long-term flame retardance while maintaining high heat resistance and to provide a thermoplastic resin shaped article that can be adopted as an electric/electronic component, an automotive component, or the like that is required to have high heat aging resistance.

DETAILED DESCRIPTION

The following provides a detailed description of an embodiment of this disclosure (hereinafter, referred to as the "present embodiment"). However, this disclosure is not limited to the following embodiment and may be implemented with various alterations that are within the essential scope thereof.

A PPE flame-retardant resin composition according to the present embodiment contains (A) a resin and (B) a flame retardant, and may optionally contain (C) an antioxidant and (D) other materials.

In particular, it is preferable to use polyphenylene ether flame-retardant resin compositions according to the following first and second aspects in the present embodiment as explained below. In the first aspect, the polyphenylene ether flame-retardant resin composition further contains (C) an antioxidant, and the (C) component has a content of 5.0 parts by mass to 20.0 parts by mass when (A) the resin is taken to be 100 parts by mass. In the second aspect, the polyphenylene ether flame-retardant resin composition contains modified PPE including at least one structural unit selected from the group consisting of the previously described formulae (1) and (2) as an (A-1) component.

The following provides a detailed description of components that can be used in the present embodiment.

((A) Resin)

In the present embodiment, (A) the resin includes (A-1) a polyphenylene ether and may optionally include (A-2) other thermoplastic resins and (A-c) a compatibilizing agent.

((A-1) Polyphenylene Ether)

Herein, (A-1) the polyphenylene ether is a homopolymer or copolymer including a repeating unit (structural unit) represented by formula (4), shown below, and/or a repeating unit (structural unit) represented by formula (5), shown below.

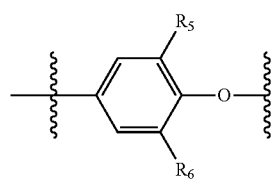

(4)

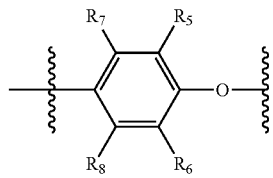

(5)

In chemical formulae (4) and (5), $R_5$, $R_6$, $R_7$, and $R_8$ each represent, independently of one another, a hydrogen atom, an alkyl group having a carbon number of 1 to 4, an aryl group having a carbon number of 6 to 9, or a halogen atom with the proviso that $R_5$ and $R_6$ are not both hydrogen.

Representative examples of polyphenylene ether homopolymers that can be used include poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly (2-methyl-6-chloroethyl-1,4-phenylene) ether, poly(2-methyl-6-hydroxyethyl-1,4-phenylene) ether, and poly(2-methyl-6-chloroethyl-1,4-phenylene) ether.

The polyphenylene ether copolymer is a copolymer having a repeating unit represented by chemical formula (4) and/or a repeating unit represented by chemical formula (5) as a main repeating unit. Examples of polyphenylene ether copolymers that can be used include a copolymer of 2,6-dimethylphenol and 2,3,6-trimethylphenol, a copolymer of 2,6-dimethylphenol and o-cresol, and a copolymer of 2,6-dimethyphenol, 2,3,6-trimethylphenol, and o-cresol.

Among polyphenylene ethers, poly(2,6-dimethyl-1,4-phenylene) ether is preferable.

Note that in the present embodiment, a structure in which $R_5$ and $R_6$ in chemical formula (4) are both methyl groups (and a structure derived therefrom as described further below) is included in a least part of the polyphenylene ether chain.

In (A-1) the polyphenylene ether used in the present embodiment, the concentration of terminal OH groups is preferably 0.6 groups to 10.0 groups, preferably 0.7 groups to 2.0 groups, and more preferably 0.7 groups to 1.5 groups per 100 monomer units forming the polyphenylene ether.

The concentration of terminal OH groups in the PPE can be calculated by NMR measurement; for example, a method described in the EXAMPLES section may be used.

The reduced viscosity (units: dL/g; measurement of chloroform solution at 30° C.) of the polyphenylene ether is preferably within a range of 0.25 to 0.6, and more preferably within a range of 0.35 to 0.55. The number average molecular weight (Mn) of the polyphenylene ether is preferably 10,000 or more, and more preferably 14,000 or more, and is preferably 20,000 or less, and more preferably 19,000 or less. The molecular weight ranges set forth above provide an excellent balance of flame retardance, fluidity, close adherence to a filler, and so forth.

In general, (A) the polyphenylene ether can be acquired as a powder that, in terms of particle size, preferably has an average particle diameter of 1 μm to 1,000 μm, more preferably 10 μm to 700 μm, and particularly preferably 100 μm to 500 μm. An average particle diameter of 1 μm or more is preferable from a viewpoint of ease of handling during processing and an average particle diameter of 1,000 μm or less is preferable in order to inhibit the occurrence of unmelted matter in melt-kneading.

Herein, (A) the polyphenylene ether includes at least one structural unit selected from chemical formulae (1), (2), and (3), shown below.

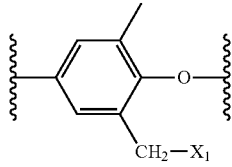

(1)

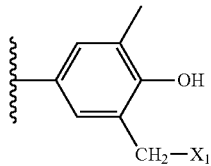

(2)

$X_1$ in chemical formulae (1) and (2) is a group selected from the group consisting of

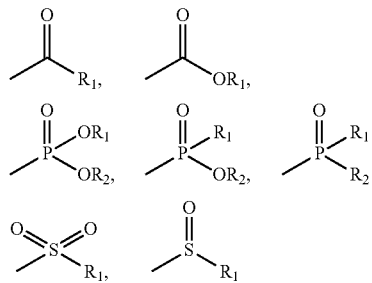

where $R_1$ and $R_2$ in $X_1$ are each, independently of one another, a substituent having a carbon number of 1 or more, such as a linear or cyclic alkyl group.

A substituent that does not have a reactive functional group is preferable as the structure of $R_1$ and $R_2$. This is because in a situation in which reactive substituents are included, a crosslinking reaction of the reactive substituents may occur upon long-term exposure of the resin composition to high temperature, which may cause deterioration of post-aging physical properties. Examples of reactive substituents include a hydroxy group, an alkoxy group, an amino group, a vinyl group, and a carbonyl group. Moreover, the structure of $R_1$ and $R_2$ may be a structure in which $R_1$ and $R_2$ are linked or a structure including a nitrogen atom and/or an oxygen atom.

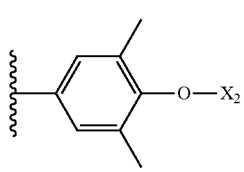

(3)

$X_2$ in chemical formula (3) is a group selected from the group consisting of

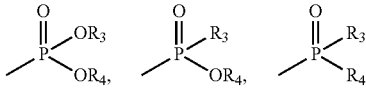

where $R_3$ and $R_4$ in $X_2$ are each, independently of one another, a group selected from the group consisting of a hydrogen atom, an alkyl group, an aryl group, an aminoalkyl group, and an arylamino group.

Moreover, $R_1$ and $R_2$ may form a cyclic structure through bonding of carbon atoms included therein. However, formula (3) does not substantially include an unsaturated double bond other than an aromatic ring unsaturated double bond. More precisely, formula (3) does not substantially include a carbon-carbon double bond other than an aromatic ring double bond.

Examples of alkyl groups that may be represented by $R_3$ and $R_4$ include alkyl groups having a carbon number of 1 to 30 and, more specifically, a methyl group, an ethyl group, an n-propyl group, an i-propyl group, an n-butyl group, a t-butyl group, a hexyl group, a cyclohexyl group, an octyl group, a decyl group, a dodecyl group, a hexadecyl group, and an octadecyl group.

Examples of aryl groups that may be represented by $R_3$ and $R_4$ include aryl groups having a carbon number of 6 to 30 and, more specifically, a phenyl group, a tolyl group, a dimethylphenyl group, a trimethylphenyl group, a naphthyl group, and a trityl group.

Examples of the alkyl group in the aforementioned alkylamino group include alkyl groups having a carbon number of 1 to 30 and, more specifically, a methyl group, an ethyl group, an n-propyl group, an i-propyl group, a butyl group, a hexyl group, a cyclohexyl group, an octyl group, a decyl group, a dodecyl group, a hexadecyl group, and an octadecyl group. Examples of the alkylamino group include a methylamino group, a dimethylamino group, an ethylamino group, a diethylamino group, an isopropylamino group, a diisopropylamino group, a butylamino group, a dibutylamino group, an octylamino group, and a dioctylamino group. Examples of the aforementioned arylamino group include a phenylamino group, a diphenylamino group, a tolylamino group, and a ditolylamino group.

The following describes the action and effect of the polyphenylene ether according to this disclosure.

When a conventional polyphenylene ether is exposed to high temperature over a long period, methyl groups in terminal units (hereinafter, referred to as "terminal methyl groups"), hydroxy groups in terminal units (hereinafter, referred to as "terminal hydroxy groups"), and methyl groups in intermediate units (hereinafter, referred to as "side chain methyl groups") may cause an oxidative crosslinking reaction, which significantly lowers heat aging resistance properties of the polyphenylene ether and a resin composition thereof. More specifically, generation of radicals occurs comparatively easily at terminal methyl groups, side chain methyl groups, and terminal hydroxy groups, and the generated radicals act as a cause of oxidative crosslinking. However, in the polyphenylene ether according to this disclosure, terminal methyl groups, side chain methyl groups, and terminal hydroxy groups that act as oxidation sites are in a blocked state through substitution with a specific molecule. This can inhibit crosslinking reaction of the terminal methyl groups, side chain methyl groups, and terminal hydroxy groups, and thereby improve heat aging resistance properties of the polyphenylene ether. As a result of terminal methyl groups, side chain methyl groups, and terminal hydroxy groups being in a blocked state through substitution with a specific molecule in (A) the polyphenylene ether according to the present embodiment, it is possible to inhibit changes in structure at terminals (terminal methyl groups and terminal hydroxy groups) of a molecular chain while the resin composition containing the PPE is in an extruder or shaping machine, and thus it is possible to improve heat aging resistance properties while also preventing coloring and improving external appearance of a shaped article. It is preferable that blocking with a specific molecule is performed to a greater degree at the terminals because terminal methyl groups and terminal hydroxy groups have greater radical generating ability as oxidation sites than side chain methyl groups.

In the chain of (A) the polyphenylene ether, the number of structural units selected from the group consisting of chemical formula (1), (2), and (3) that are included per 100 monomer units forming the polyphenylene ether is preferably 0.01 units to 10.0 units, and more preferably 0.03 units to 5.0 units.

Moreover, the ratio of structural units represented by chemical formula (1) relative to structural units represented by chemical formula (2) is preferably 0 mol % to 90 mol %, more preferably 0 mol % to 70 mol %, even more preferably 0 mol % to 50 mol %, further preferably 0 mol % to 30 mol %, and even further preferably 0 mol % to 28 mol % from a viewpoint of heat aging resistance properties and mechanical properties.

This ratio can be adjusted to within any of the ranges set forth above through adjustment of the type of a subsequently described reactive compound, the reaction temperature, reaction time, and reaction liquid stirring efficiency in a reaction of a precursor PPE with the reactive compound, and so forth.

Particularly in a case in which (A) the polyphenylene ether according to this disclosure includes at least one structural unit selected from chemical formulae (1) and (2), the number of structural units selected from the group consisting of chemical formulae (1) and (2) that are included in (A) the polyphenylene ether chain is preferably within a range of 0.1 units to 10 units per 100 monomer units forming the polyphenylene ether.

Inclusion of 0.1 or more structural units selected from the group consisting of chemical formulae (1) and (2) per 100 units can improve heat aging resistance properties and fluidity, whereas inclusion of 10 or fewer structural units selected from the group consisting of chemical formulae (1) and (2) per 100 units can improve heat aging resistance without deterioration of mechanical properties.

The number of structural units represented by either of formulae (1) and (2) per 100 units is more preferably within a range of 0.1 units to 3.0 units, and even more preferably within a range of 0.1 units to 1.0 units.

Particularly in a case in which (A) the polyphenylene ether according to this disclosure includes a structural unit represented by chemical formula (3), the number of structural units represented by formula (3) that are included per 100 monomer units forming the polyphenylene ether is preferably within a range of 0.01 units to 10 units, more preferably within a range of 0.01 units to 5.0 units, even more preferably within a range of 0.03 units to 3.0 units, and further preferably within a range of 0.03 units to 1.0 units. Inclusion of 0.01 or more structural units represented by formula (3) can improve heat aging resistance properties, whereas inclusion of 10 or fewer structural units represented by formula (3) can improve heat aging resistance without deterioration of mechanical properties, and inclusion of 5 or fewer structural units represented by formula (3), in particular, further improves the balance of heat resistance, mechanical properties, and heat aging resistance.

In the present embodiment, inclusion of structural units represented by all of formulae (1), (2), and (3) is preferable for both inhibiting crosslinking of the polyphenylene ether and achieving good long-term flame retardance.

Moreover, a case in which $X_1$ in chemical formulae (1) and (2) is a group selected from the group consisting of

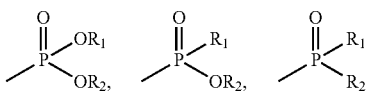

is preferable in the present embodiment.

Furthermore, (A-1) the polyphenylene ether used in the present embodiment preferably includes at least one structural unit selected from the group consisting of formulae (6) and (7), shown below.

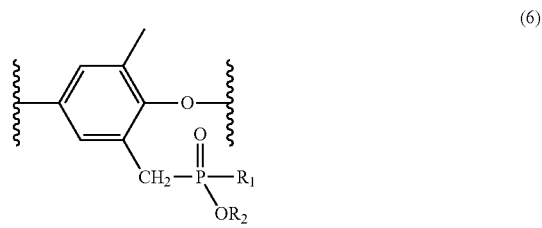

(6)

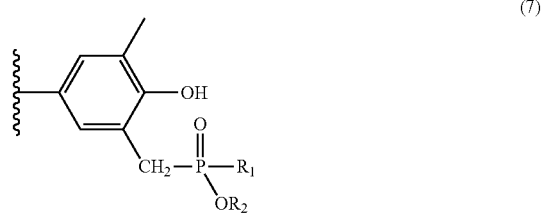

(7)

Note that $R_1$ and $R_2$ in chemical formulae (6) and (7) may be the same as $X_1$ in chemical formulae (1) and (2).

<Method of Synthesis of Modified Polyphenylene Ether>

A modified polyphenylene ether is preferably obtained by reacting a subsequently described reactive compound with a precursor of (A-1) the polyphenylene ether (hereinafter, also referred to as a "precursor polyphenylene ether") that has a substituent on the methylene group in formula (1) and formula (2) that is different to X in formula (1) and formula (2). The modified polyphenylene ether according to the present embodiment can be more efficiently obtained through synthesis from the precursor polyphenylene ether than through synthesis from a polyphenylene ether for which the X part in chemical formulae (1) and (2) for (A-1) the polyphenylene ether is hydrogen (i.e., polyphenylene ether obtained after monomer polymerization but before modification of the polymer; hereinafter, also referred to as "unsubstituted polyphenylene ether").

In the modified polyphenylene ether according to the present embodiment, it is preferable that a structural unit of chemical formula (3) is obtained in the same manner as previously described by causing a precursor polyphenylene ether and a subsequently described reactive compound to react through heating. Moreover, it is preferable that a structural unit of chemical formula (3) is obtained by reacting the reactive compound with a terminal hydroxy group of the polyphenylene ether.

The precursor polyphenylene ether is preferably a polyphenylene ether in which terminal group and side chain group-containing structural units represented by chemical formulae (8) and (9), shown below, are included in an unsubstituted polyphenylene ether chain. Through inclusion of structural units of the following chemical formulae (8) and (9) in the precursor PPE, (A) the polyphenylene ether can be obtained with sufficient efficiency (specifically, in production of (A) the PPE, (A) the PPE can be obtained via the precursor PPE with sufficient efficiency because the $CH_2$—Y part of the structures of chemical formulae (8) and (9) is selectively cleaved and undergoes a substitution reaction with the subsequently described reactive compound). Moreover, since the precursor PPE can be easily synthesized from an unsubstituted PPE, (A) the PPE can be efficiently synthesized via the precursor PPE.

Furthermore, the total content of the aforementioned structural units in the polyphenylene ether chain of the precursor PPE is preferably 0.1 units to 10 units per 100 units of the polyphenylene ether chain.

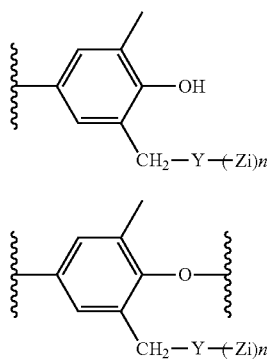

(In formulae (8) and (9), Y represents a N atom or an O atom, and Zi represents a saturated or unsaturated hydrocarbon group that has a carbon number of 1 to 20 and that is cyclic or chain-shaped (i.e., linear or branched). Furthermore, in formulae (8) and (9), i and n are each an integer of 1 or 2, where Z1 and Z2 may be the same or different and may form a cyclic structure in conjunction with Y bonded thereto through bonding therebetween.)

No specific limitations are placed on the method used to produce the precursor polyphenylene ether including structural units of formulae (8) and (9). Examples of methods that can be used include a method in which (al) a compound such as an amine, an alcohol, or morpholine is added and caused to react in a polymerization reaction of a polyphenylene ether and a method in which an unsubstituted polyphenylene ether that has been polymerized is stirred at 20° C. to 60° C., and preferably at 40° C., in a solvent such as toluene in which the PPE is soluble, and the aforementioned (al) compound is added thereto and is caused to react.

Although no specific limitations are placed on the (al) compound, specific examples thereof include primary amines such as n-propylamine, isopropylamine, n-butylamine, isobutylamine, sec-butylamine, n-hexylamine, n-octylamine, 2-ethylhexylamine, cyclohexylamine, laurylamine, and benzylamine; secondary amines such as diethylamine, di-n-propylamine, di-n-butylamine, diisobutylamine, di-n-octylamine, piperidine, and 2-pipecoline; alcohols such as methanol, ethanol, n-propanol, isopropanol, n-butanol, isobutanol, and sec-butanol; and morpholine.

No specific limitations are placed on the method used to obtain (A-1) the polyphenylene ether. Examples of methods that can be used include a method in which a subsequently described reactive compound is added in polymerization of a polyphenylene ether and polymerization of (A-1) the polyphenylene ether is carried out, a method in which a small amount of a monomer substituted with a subsequently described reactive compound is added in polymerization of a polyphenylene ether and polymerization of (A-1) the polyphenylene ether is carried out, and a method in which an unsubstituted polyphenylene ether and a reactive compound are melt-kneaded and caused to react. More specific examples include a method in which the (al) compound is added and caused to react in polymerization of PPE, and a subsequently described reactive compound is then caused to react, a method in which a small amount of 2,6-dimethylphenol that has been substituted with the (al) compound is added and caused to react in polymerization of PPE, and a method in which a precursor PPE is obtained and the precursor PPE and a reactive compound are subsequently melt-kneaded and caused to react (i.e., the precursor PPE and the reactive compound are, for example, melt-kneaded in production of a resin composition by melt-kneading using the precursor PPE).

Examples of reactive compounds that can be used to obtain (A-1) the polyphenylene ether according to the present embodiment include, but are not specifically limited to, phosphonic acids, phosphonic acid esters, phosphinic acids, phosphinic acid esters, monocarboxylic acids, sulfonic acids, sulfinic acids, and carbonates.

Examples of phosphonic acids that can be used include phosphonic acid (phosphorus acid), methylphosphonic acid, ethylphosphonic acid, vinylphosphonic acid, decylphosphonic acid, phenylphosphonic acid, benzylphosphonic acid, aminomethylphosphonic acid, methylenediphosphonic acid, 1-hydroxyethane-1,1-diphosphonic acid, 4-methoxyphenylphosphonic acid, and propylphosphonic anhydride.

Examples of phosphonic acid esters that can be used include dimethyl phosphonate, diethyl phosphonate, bis(2-ethylhexyl) phosphonate, dioctyl phosphonate, dilauryl phosphonate, dioleyl phosphonate, diphenyl phosphonate, dibenzyl phosphonate, dimethyl methylphosphonate, diphenyl methylphosphonate, dioctyl methylphosphonate, diethyl ethylphosphonate, dioctyl ethylphosphonate, diethyl benzylphosphonate, dimethyl phenylphosphonate, diethyl phenylphosphonate, dipropyl phenylphosphonate, dioctyl phenylphosphonate, diethyl (methoxymethyl)phosphonate, dioctyl (methoxymethyl)phosphonate, diethyl vinylphosphonate, diethyl hydroxymethylphosphonate, dimethyl (2-hydroxyethyl)phosphonate, dioctyl (methoxymethyl)phosphonate, diethyl p-methylbenzylphosphonate, dioctyl p-methylbenzylphosphonate, diethylphosphonoacetic acid, ethyl diethylphosphonoacetate, tert-butyl diethylphosphonoacetate, dioctyl diethylphosphonate, diethyl (4-chlorobenzyl)phosphonate, dioctyl (4-chlorobenzyl)phosphonate, diethyl cyanophosphonate, diethyl cyanomethylphosphonate, dioctyl cyanophosphonate, diethyl 3,5-di-tert-butyl-4-hydroxybenzylphosphonate, dioctyl 3,5-di-tert-butyl-4-hydroxybenzylphosphonate, and diethyl (methylthiomethyl)phosphonate.

Examples of phosphinic acids that can be used include dimethylphosphinic acid, ethylmethylphosphinic acid, diethylphosphinic acid, methyl-n-propylphosphinic acid, diphenylphosphinic acid, dioleylphosphinic acid, 9,10-dihydro-9-oxa-10-phosphaphenanthrene-10-oxide, and derivatives thereof.

Examples of phosphinic acid esters that can be used include methyl dimethylphosphinate, ethyl dimethylphosphinate, n-butyl dimethylphosphinate, cyclohexyl dimethylphosphinate, vinyl dimethylphosphinate, phenyl dimethylphosphinate, methyl ethylmethylphosphinate, ethyl ethylmethylphosphinate, n-butyl ethylmethylphosphinate, cyclohexyl ethylmethylphosphinate, vinyl ethylmethylphosphinate, phenyl ethylmethylphosphinate, methyl diethylphosphinate, ethyl diethylphosphinate, n-butyl diethylphosphinate, cyclohexyl diethylphosphinate, vinyl diethylphosphinate, phenyl diethylphosphinate, methyl diphenylphosphinate, ethyl diphenylphosphinate, n-butyl diphenylphosphinate, cyclohexyl diphenylphosphinate, vinyl diphenylphosphinate, phenyl diphenylphosphinate, methyl methyl-n-propylphosphinate, ethyl methyl-n-propylphosphinate, n-butyl methyl-n-propylphosphinate, cyclohexyl methyl-n-propylphosphinate, vinyl methyl-n-propylphosphinate, phenyl methyl-n-propylphosphinate, methyl dioleylphosphinate, ethyl dioleylphosphinate, n-butyl dioleylphosphinate, cyclohexyl dioleylphosphinate, vinyl dioleylphosphinate, and phenyl dioleylphosphinate.

Examples of monocarboxylic acids that can be used include monocarboxylic acids such as formic acid, acetic acid, propionic acid, butyric acid, hexanoic acid, heptanoic acid, octanoic acid, nonanoic acid, decanoic acid, dodecanoic acid, tetradecanoic acid, octadecanoic acid, docosanoic acid, hexacosanoic acid, octadecenoic acid, docosenoic acid, and isooctadecanoic acid, alicyclic monocarboxylic acids such as cyclohexane carboxylic acid, aromatic monocarboxylic acids such as benzoic acid and methylbenzoic acid, hydroxy aliphatic monocarboxylic acids such as hydroxypropionic acid, hydroxyoctadecanoic acid, and hydroxyoctadecenoic acid, and sulfur-containing aliphatic monocarboxylic acids such as alkyl thiopropionic acid.

Examples of sulfonic acids that can be used include alkyl sulfonic acids, benzenesulfonic acid, naphthalenesulfonic acid, anthraquinonesulfonic acid, camphorsulfonic acid, and derivatives of the preceding sulfonic acids. These sulfonic acids may be monosulfonic acids, disulfonic acids, or trisulfonic acids. Examples of derivatives of benzenesulfonic acid that can be used include phenolsulfonic acid, styrenesulfonic acid, toluenesulfonic acid, and dodecylbenzenesulfonic acid. Examples of derivatives of naphthalenesulfonic acid that can be used include 1-naphthalenesulfonic acid, 2-naphthalenesulfonic acid, 1,3-naphthalenedisulfonic acid, 1,3,6-naphthalenetrisulfonic acid, and 6-ethyl-1-naphthalenesulfonic acid. Examples of derivatives of anthraquinonesulfonic acid that can be used include anthraquinone-1-sulfonic acid, anthraquinone-2-sulfonic acid, anthraquinone-2,6-disulfonic acid, and 2-methylanthraquinone-6-sulfonic acid.

Examples of sulfinic acids that can be used include alkane sulfinic acids such as ethanesulfinic acid, propanesulfinic acid, hexanesulfinic acid, octanesulfinic acid, decanesulfinic acid, and dodecanesulfinic acid; alicyclic sulfinic acids such as cyclohexanesulfinic acid and cyclooctanesulfinic acid; and aromatic sulfinic acids such as benzenesulfinic acid, o-toluenesulfinic acid, p-toluenesulfinic acid, ethylbenzenesulfinic acid, decylbenzenesulfinic acid, dodecylbenzenesulfinic acid, chlorobenzenesulfinic acid, and naphthalenesulfinic acid.

Examples of carbonates that can be used include dimethyl carbonate, diethyl carbonate, diisopropyl carbonate, dibutyl carbonate, dihexyl carbonate, dioctyl carbonate, diphenyl carbonate, methyl ethyl carbonate, methyl phenyl carbonate, ethyl phenyl carbonate, butyl phenyl carbonate, and ditolyl carbonate.

From a viewpoint of reactivity, the reactive compound is preferably a phosphoric compound. Specifically, the reactive compound is preferably diphenyl phosphonate, dioleyl phosphonate, dioctyl phosphonate, diphenylphosphinic acid, or dioleylphosphinic acid, and is more preferably 9,10-dihydro-9-oxa-10-phosphaphenanthrene-10-oxide. Through use of a modified polyphenylene ether obtained using 9,10-dihydro-9-oxa-10-phosphaphenanthrene-10-oxide, it is possible to improve heat aging resistance properties and also further improve fluidity during melt-kneading of the resin composition in which the PPE is used.

Moreover, (A-1) the polyphenylene ether may, for example, include the precursor PPE (unmodified PPE) and the reactive compound.

((A-2) Other Thermoplastic Resins)

Examples of (A-2) other thermoplastic resins that may be used in the present embodiment include, but are not specifically limited to, (A-2-1) a polystyrene resin, (A-2-2) a polyamide resin, and (A-2-3) a polypropylene resin. It is preferable to use (A-2-1) a polystyrene resin since polystyrene resins have good compatibility with a polyphenylene ether and increase heat aging resistance through an action of inhibiting crosslinking of the polyphenylene ether.

(A-2-1) Polystyrene Resin

The polystyrene resin that may be used in the present embodiment is a homopolymer of styrene or a styrene derivative, or a copolymer having styrene or a styrene derivative as a main component. Examples of the styrene derivative include, but are not specifically limited to, o-methylstyrene, m-methylstyrene, p-methylstyrene, t-butylstyrene, α-methylstyrene, β-methylstyrene, diphenylethylene, chlorostyrene, and bromostyrene.

Examples of homopolymer polystyrene resins that can be used include polystyrene, poly(α-methylstyrene), and poly(chlorostyrene).

Examples of copolymer polystyrene resins that can be used include, but are not specifically limited to, a styrene-butadiene copolymer, a styrene-acrylonitrile copolymer, a styrene-maleic acid copolymer, a styrene-maleic anhydride copolymer, a styrene-maleimide copolymer, a styrene-N-phenylmaleimide copolymer, a styrene-N-alkylmaleimide copolymer, a styrene-N-alkyl-substituted phenylmaleimide copolymer, a styrene-acrylic acid copolymer, a styrene-methacrylic acid copolymer, a styrene-methyl acrylate copolymer, a styrene-methyl methacrylate copolymer, a styrene-n-alkyl acrylate copolymer, a styrene-n-alkyl methacrylate copolymer, an ethylvinylbenzene-divinylbenzene copolymer, terpolymers such as ABS and a butadiene-acrylonitrile-α-methylbenzene copolymer, and graft copolymers such as styrene-grafted polyethylene, a styrene-grafted ethylene-vinyl acetate copolymer, (styrene-acrylic acid)-grafted polyethylene, and styrene-grafted polyamide.

One of these polystyrene resins may be used individually, or two or more of these polystyrene resins may be used in combination.

The content of (A-2-1) the polystyrene resin in the resin composition relative to 100 parts by mass of (A-1) the polyphenylene ether is preferably 10 parts by mass to 100 parts by mass, and more preferably 20 parts by mass to 70 parts by mass.

(A-2-2) Polyamide Resin

The polyamide resin that may be used in the present embodiment may be any resin having an amide bond [—NH—C(=O)—] in a repeating unit (structural unit) of a polymer.

Polyamides are generally obtained through ring opening polymerization of a lactam, polycondensation of a diamine and a dicarboxylic acid, polycondensation of an aminocarboxylic acid, or the like. However, the polyamide is not limited to being obtained in this manner.

Diamines that can be used are broadly classified as aliphatic diamines, alicyclic diamines, and aromatic diamines. Specific examples include tetramethylenediamine, hexamethylenediamine, nonamethylenediamine, undecamethylenediamine, dodecamethylenediamine, tridecamethylenediamine, 2-methyl-1,8-octamethylenediamine, 2,2,4-trimethylhexamethylenediamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylylenediamine, and p-xylylenediamine.

Dicarboxylic acids that can be used are broadly classified as aliphatic dicarboxylic acids, alicyclic dicarboxylic acids, and aromatic dicarboxylic acids. Specific examples include adipic acid, suberic acid, azelaic acid, sebacic acid, dodecanedioic acid, 1,1,3-tridecanedioic acid, 1,3-cyclohexanedicarboxylic acid, terephthalic acid, isophthalic acid, naphthalenedicarboxylic acid, and dimer acids.

Specific examples of lactams that can be used include ε-caprolactam, enantholactam, and ω-laurolactam.

Specific examples of aminocarboxylic acids that can be used include ε-aminocaproic acid, 7-aminoheptanoic acid, 8-aminooctanoic acid, 9-aminononanoic acid, 11-aminoundecanoic acid, 12-aminododecanoic acid, and 13-aminotridecanoic acid.

In this disclosure, any copolymerized polyamide obtained by polycondensation of one or a mixture of two or more of the diamines, dicarboxylic acids, lactams, and aminocarboxylic acids listed above may be used.

Moreover, it is also possible to suitably use a product that is obtained by polymerizing any of these lactams, diamines, dicarboxylic acids, and ω-aminocarboxylic acids in a polymerization reactor until a low molecular weight oligomer stage is reached and then carrying out polymerization to reach a high molecular weight in an extruder or the like.

In particular, examples of polyamides that can be effectively used in this disclosure include polyamide 6, polyamide 6,6, polyamide 4,6, polyamide 11, polyamide 12, polyamide 6,10, polyamide 6,12, polyamide 6/6,6, polyamide 6/6,12, polyamide 6,MXD (m-xylylenediamine), polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I, polyamide 6,6/12/6,I, and polyamide 9,T. Furthermore, polyamides obtained by copolymerizing a plurality of polyamides in an extruder or the like can also be used.

The polyamide is preferably polyamide 6, polyamide 6,6, polyamide 6/6,6, or a mixture thereof, and is most preferably polyamide 6,6 used individually or a mixture of polyamide 6,6 and polyamide 6.

In a case in which a mixture of polyamide 6,6 and polyamide 6 is used as the polyamide, the amount of polyamide 6,6 is preferably from 70 mass % to 99 mass %, and more preferably from 85 mass % to 5 mass % when the amount of the mixture of all polyamide 6,6 and polyamide 6 that are used is taken to be 100 mass %.

A viscosity number of the polyamide used in this disclosure as measured in accordance with ISO 307:1994 using 96% sulfuric acid is preferably 100 mL/g to 130 mL/g, and more preferably 110 mL/g to 128 mL/g. The use of a polyamide having a viscosity number within any of the ranges set forth above enables a better balance of fluidity and mechanical properties of the resin composition.

The polyamide used in this disclosure may be a mixture of a plurality of types of polyamides having different viscosity numbers. In a case in which a plurality of types of polyamides are used, the polyamide mixture thereof preferably has a viscosity number within any of the ranges set forth above. It can easily be confirmed that the polyamide mixture has a viscosity number in any of the ranges set forth above through actual measurement of the viscosity number of the mixture of polyamides that have been mixed in a desired mixing ratio.

The content of (A-2-2) the polyamide resin in the resin composition relative to 100 parts by mass of (A-1) the polyphenylene ether is preferably 10 parts by mass to 100 parts by mass, and more preferably 20 parts by mass to 70 parts by mass.

(A-2-3) Polypropylene Resin

The polypropylene resin that may be used in the present embodiment is, for example, a crystalline propylene homopolymer, a crystalline propylene-ethylene block copolymer including a crystalline propylene homopolymer portion obtained in a first stage of polymerization and a propylene-ethylene random copolymer portion obtained through copolymerization of propylene, ethylene, and/or one or more other α-olefins (for example, 1-butene or 1-hexene) in a second stage or later of polymerization, or a mixture of the aforementioned crystalline propylene homopolymer and the aforementioned crystalline propylene-ethylene block copolymer.

The content of (A-2-3) the polypropylene resin in the resin composition relative to 100 parts by mass of (A-1) the polyphenylene ether is preferably 10 parts by mass to 100 parts by mass, and more preferably 20 parts by mass to 70 parts by mass.

(A-c) Compatibilizing Agent

A compatibilizing agent may be selected for use in the present embodiment as appropriate depending on (A-2) other thermoplastic resins that are used.

In a case in which (A-2-2) a polyamide resin is used as (A-2) another thermoplastic resin, at least one compound that includes, in a molecular structure thereof, at least one carbon-carbon double or triple bond and at least one carboxyl group, acid anhydride group, amino group, hydroxy group, or glycidyl group, such as described in detail in WO 2001/81473 A1, is preferably used as (A-c) the compatibilizing agent.

Of such compounds, maleic anhydride, maleic acid, fumaric acid, citric acid, and mixtures thereof are preferable, and maleic acid and/or maleic anhydride is particularly preferable. In particular, by selecting maleic acid and/or maleic anhydride as the compatibilizing agent, it is possible to improve additional properties of the resin composition such as weld strength.

In a case in which maleic acid and/or maleic anhydride is selected as the compatibilizing agent, the content of the compound in the resin composition relative to 100 parts by mass of (A-1) the polyphenylene ether is preferably 0.03 parts by mass to 0.3 parts by mass, more preferably 0.07 parts by mass to 0.3 parts by mass, and even more preferably 0.1 parts by mass to 0.3 parts by mass.

In a case in which (A-2-3) a polypropylene resin is used as (A-2) another thermoplastic resin, a hydrogenated block copolymer having a specific structure can be used as (A-c) the compatibilizing agent.

The hydrogenated block copolymer is preferably a polymer obtained by hydrogenating a block copolymer including at least two polymer blocks A formed mainly from styrene and at least one polymer block B formed mainly from butadiene in which the 1,2-vinyl bond content of butadiene is 70% to 90%.

The polymer block B formed mainly from butadiene may be a single polymer block in which the 1,2-vinyl bond content of butadiene prior to hydrogenation is 70% to 90%.

Furthermore, the polymer block B formed mainly from butadiene may be a combined polymer block formed mainly from butadiene that includes at least one polymer block B1 formed mainly from butadiene in which the 1,2-vinyl bond content prior to hydrogenation is 70% to 90% and at least one polymer block B2 formed mainly from butadiene in which the 1,2-vinyl bond content prior to hydrogenation is 30% to less than 70%. A block copolymer that has a block structure such as described above can, for example, be expressed as "A-B2-B1-A" and can be obtained by a commonly known polymerization method in which the 1,2-vinyl bond content is controlled based on the feed sequence of each prepared monomer unit. The bonding format of butadiene prior to hydrogenation can be confirmed, for example, using an infrared spectrophotometer or an NMR spectrometer.

Commonly known production methods can be adopted as the production method of the hydrogenated block copolymer without any specific limitations. Specific examples of commonly known production methods include methods described in JP S47-11486 A, JP S49-66743 A, JP S50-75651 A, JP S54-126255 A, JP S56-10542 A, JP S56-62847 A, JP S56-100840 A, JP H2-300218 A, GB 1130770 A, U.S. Pat. Nos. 3,281,383, 3,639,517 A, GB 1020720 A, U.S. Pat. Nos. 3,333,024, and 4,501,857 A.

The content of the hydrogenated block copolymer in the resin composition relative to 100 parts by mass, in total, of (A-1) the polyphenylene ether and (A-2-3) the polypropylene resin is preferably 1 part by mass to 100 parts by mass, more preferably 1 part by mass to 40 parts by mass, even more preferably 2 parts by mass to 20 parts by mass, and particularly preferably 2 parts by mass to 10 parts by mass.

((B) Flame Retardant)

Examples of (B) flame retardants that may be used in the present embodiment include commonly known inorganic flame retardants, representative examples of which include magnesium hydroxide and aluminum hydroxide; nitrogen-containing cyclic compounds, representative examples of which include melamine, cyanuric acid, and salts thereof; organophosphate esters, representative examples of which include triphenyl phosphate, hydroxy triphenyl phosphate, and bisphenol A bis(diphenyl phosphate); phosphoric acid-based nitrogen-containing compounds, representative examples of which include ammonium polyphosphate and melamine polyphosphate; phosphazene compounds such as described in JP H11-181429 A; boric acid compounds such as zinc borate; silicone oils; phosphinic acid salts described in WO 2007/055147 A1; red phosphorus; phosphinic acid salts; and other commonly known flame retardants.

Of these flame retardants, organophosphate esters including bisphenol A bis(diphenyl phosphate) and derivatives thereof; phosphazene compounds; phosphinic acid salts; and mixtures thereof are more preferable.

Although the content of (B) the flame retardant in the resin composition differs depending on the required level of flame retardance, the content is preferably 2 parts by mass to 35 parts by mass, and more preferably 5 parts by mass to 30 parts by mass relative to 100 parts by mass of (A) the resin. An excellent balance of flame retardance, heat resistance, and impact resistance can be obtained when the content of (B) the flame retardant is within any of the ranges set forth above.

((C) Antioxidant)

Both primary antioxidants that act as radical chain inhibitors and secondary antioxidants that have an effect of breaking down peroxides can be used as (C) an antioxidant that may be used in the present embodiment. In other words, through the use of an antioxidant, radicals that may arise at terminal methyl groups or side chain methyl groups when the polyphenylene ether is exposed to high temperature for a long time can be captured (primary antioxidant) or peroxides that may arise at terminal methyl groups or side chain methyl groups due to the aforementioned radicals can be broken down (secondary antioxidant). Consequently, oxidative crosslinking of the polyphenylene ether can be prevented.

Hindered phenol antioxidants can mainly be used as primary antioxidants.

Specific examples of hindered phenol antioxidants that can be used include 2,6-di-t-butyl-4-methylphenol, pentaerythritol tetrakis[3-(3,5-di-t-butyl-4-hydroxyphenyl)propionate], n-octadecyl-3-(3,5-di-t-butyl-4-hydroxyphenyl) propionate, 2,2'-methylenebis(4-methyl-6-t-butylphenol), 2,6-di-t-butyl-4-(4,6-bis(octylthio)-1,3,5-triazin-2-ylamino) phenol, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 4,4'-butylidenebis(3-methyl-6-t-butylphenol), 4,4'-thiobis(3-methyl-6-t-butylphenol), alkylated bisphenol, tetrakis[methylene-3-(3,5-di-t-butyl-4-hydroxyphenyl)propionate] methane, and 3,9-bis[2-{3-(3-t-butyl-4-hydroxy-5-methylphenyl)-propionyloxy}-1,1-dimeth ylethyl]-2,4,8,10-tetraoxyspiro[5,5]undecane.

Phosphoric antioxidants and sulfuric antioxidants can mainly be used as secondary antioxidants.

Specific examples of phosphoric antioxidants that can be used include trisnonylphenyl phosphite, triphenyl phosphite, tris(2,4-di-t-butylphenyl) phosphite, bis(2,4-di-t-butylphenyl)pentaerythritol-diphosphite, bis(2,6-di-t-butyl-4-methylphenyl)pentaerythritol-diphosphite, and 3,9-bis(2,6-di-tert-butyl-4-methylphenoxy)-2,4,8,10-tetraoxa-3,9-diphosphaspiro[5,5]undecane.

Specific examples of sulfuric antioxidants that can be used include dilauryl 3,3'-thiodipropionate, dimyristyl 3,3'-thiodipropionate, distearyl 3,3'-thiodipropionate, pentaerythrityl tetrakis(3-laurylthiopropionate), ditridecyl 3,3'-thiodipropionate, 2-mercaptobenzimidazole, and 2,6-di-tert-butyl-4-(4,6-bis(octylthio)-1,3,5-triazin-2-ylamino)phenol.

Furthermore, examples of other antioxidants that can be used together with the antioxidants described above include metal oxides and sulfides such as zinc oxide, magnesium oxide, and zinc sulfide.

Of these antioxidants, secondary antioxidants are effective for improving long-term properties of the polyphenylene ether resin, and among secondary antioxidants, phosphoric antioxidants are preferable.

A suitable range for the content of (C) the antioxidant in the resin composition may differ for the first aspect of this disclosure in which a larger amount of (C) the antioxidant is added and the second aspect of this disclosure in which a modified PPE is used.

Specifically, in the first aspect, which is a case in which an unmodified polyphenylene ether resin is used and (C) an antioxidant is added, the content of (C) the antioxidant relative to 100 parts by mass of (A-1) the polyphenylene ether resin is preferably 5 parts by mass to 20 parts by mass, more preferably 8.0 parts by mass to 18 parts by mass, and even more preferably 9.0 parts by mass to 16.0 parts by mass.

Moreover, in the second aspect, which is a case in which a PPE that has been modified with a reactive compound such as previously described is used, the content of (C) the antioxidant relative to 100 parts by mass of (A-1) the polyphenylene ether resin is preferably 0.1 parts by mass to 5.0 parts by mass, more preferably 0.1 parts by mass to 3.0 parts by mass, even more preferably 0.15 parts by mass to 0.3 parts by mass, further preferably 0.15 parts by mass to 0.25 parts by mass, and particularly preferably 0.16 parts by mass to 0.22 parts by mass.

Excellent initial flame retardance and flame retardance after long-term heat aging can be achieved, and a flame-retardant resin composition having excellent mechanical strength can be obtained in both the first aspect and the second aspect when the content of (C) the antioxidant is within any of the ranges set forth above.

((D) Other Materials)

Examples of other materials that may be added as necessary in the present embodiment include, but are not specifically limited to, inorganic fillers (for example, talc, kaolin, xonotlite, wollastonite, titanium oxide, potassium titanate, carbon fiber, and glass fiber); commonly known silane coupling agents for improving affinity between inorganic fillers and resins; plasticizers (for example, low molecular weight polyolefins, polyethylene glycol, and fatty acid esters); colorants such as carbon black; conductivity imparting agents such as carbon fiber, conductive carbon black, and carbon fibrils; anti-static agents; various peroxides; ultraviolet absorbers; and light stabilizers.

The following describes important attributes of the polyphenylene ether flame-retardant resin composition according to the present embodiment.

In order to increase the effects disclosed herein, the content of (A-1) the polyphenylene ether in the PPE flame-retardant resin composition according to the present embodiment is 50 mass % or more, preferably 60 mass % or more, and more preferably 65 mass % or more, and is preferably 95 mass % or less, and more preferably 90 mass % or less when the flame-retardant resin composition minus ash content, corresponding to a residue obtained upon burning of the flame-retardant resin composition, is taken to be 100 mass %.

The "ash content" is a value calculated by the following method. A sample of approximately 2 g is precisely weighed out from a shaped article of 12.6 cm in length, 1.3 cm in width, and 1.6 mm in thickness, is placed in a porcelain crucible, and is burned in an electric furnace for 1 hour at 800° C. After this burning, the porcelain crucible is cooled to room temperature and the amount of residue in the porcelain crucible is taken to be the ash content.

Specifically, the ash content may include, for example, inorganic fillers such as glass and minerals, metal oxides, and so forth.

Moreover, in the PPE flame-retardant resin composition according to the present embodiment, a rate of change in chloroform-insoluble content of the flame-retardant resin composition through aging in which the flame-retardant resin composition is left for 1,000 hours at 150° C. in an atmospheric air is 15 mass % or less, preferably 14 mass % or less, and even more preferably 12 mass % or less, and is preferably 1 mass % or more, and more preferably 5 mass % or more.

The "rate of change of chloroform-insoluble content" is a value calculated by the following method.

A shaped article of 12.6 cm in length, 1.3 cm in width, and 1.6 mm in thickness is prepared. Thereafter, 1) a sample of 1 cm×1 cm×1.6 mm is cut from a bottom edge of the shaped article prior to aging, is frozen and pulverized, and is subsequently sieved in order to collect particles that pass through 500 μm openings but not through 355 μm openings. Next, 200 mg of the collected particles are weighed out and are ultrasonicated for 6 hours in 40 mL of chloroform. Soluble content and insoluble content are then separated by suction filtration. The resultant residue (insoluble content) is vacuum dried for 2 hours at 100° C. and the mass of the dried residue is measured. The measured value is taken to be the "initial amount of residue". Additionally, 2) a shaped article that has been subjected to aging in which the shaped article is left for 1,000 hours at 150° C. is processed by the same method as in 1) from cutting until drying, and then the mass of the resultant residue is measured. The measured value is taken to be the "post-aging amount of residue". The rate of change (%) of insoluble content is calculated from the values obtained in 1) and 2) using equation (X), shown below.

$$[\text{Post-aging amount of residue (mg)} - \text{Initial amount of residue (mg)}]/[200 - \text{Initial amount of residue (mg)}] \times 100 [\%] \quad (X)$$

In the present embodiment, with the proviso of satisfying a requirement that the mass percentage of the (A-1) component in the flame-retardant resin composition is 50 mass % or more relative to the flame-retardant resin composition minus ash content as previously described and a requirement that the rate of change of chloroform-insoluble content in the flame-retardant resin composition through aging is 15 mass % or less as previously described, it is particularly preferable that a polyphenylene ether flame-retardant resin composition according to the first aspect or the second aspect described below is adopted from a viewpoint of effectively achieving the excellent flame retardance and long-term flame retardance that are desired herein.

In the first aspect, the polyphenylene ether flame-retardant resin composition further contains (C) an antioxidant, and the (C) component has a content of 5.0 parts by mass to 20.0 parts by mass when (A) the resin is taken to be 100 parts by mass.

In the second aspect, a modified PPE including at least one structural unit selected from the group consisting of the previously described formulae (1) and (2) is used as the (A-1) component in the polyphenylene ether flame-retardant resin composition.

Embodiments and suitable forms of these aspects are as previously described.

(Shaped Article)

A shaped article according to the present embodiment is formed from the resin composition according to the present embodiment set forth above.

Suitable methods of shaping the resin composition include, but are not limited to, injection molding, extrusion molding, vacuum forming, and pressure forming. In particular, injection molding is more suitable from a viewpoint of shaping external appearance and brightness.

Specific examples of processing machines that can be used for obtaining the composition used in the shaped article according to the present embodiment include a single screw extruder, a twin screw extruder, a hot press, a roller, a kneader, a Brabender Plastograph, and a Banbury mixer, of which, a twin screw extruder is preferable.

Although no specific limitations are placed on the temperature of melt-kneading, a temperature that enables formation of a suitable composition can be freely selected from a temperature range that is normally 240° C. to 360° C. when the kneading state and so forth are considered.

EXAMPLES

The following provides a more specific description of the present embodiment through examples and comparative examples. However, the present embodiment is not limited to just the following examples.

Firstly, resin composition raw materials that were used in the examples and comparative examples are described.

<(A-1) Polyphenylene Ether (PPE)>

(A-1-1) PPE-1

Unmodified poly(2,6-dimethyl-1,4-phenylene ether)

A jacketed reactor having a capacity of 10 L and equipped with a stirrer, a thermometer, a condenser, and an oxygen supply tube that extended to the bottom of the reactor was charged with 2 g of cupric bromide that was then dissolved in 35 g of dibutylamine and 800 g of toluene. A solution of 200 g of 2,6-dimethylphenol dissolved in 500 g of toluene was added to the resultant catalyst solution. The mixed liquid of these solutions was caused to undergo polymerization for 3 hours at 40° C. in the reactor while oxygen was supplied thereto. After the reaction had been terminated, the reaction liquid was brought into contact with water and the catalyst was removed from the reaction liquid to obtain a polyphenylene ether polymerization reaction liquid. The polyphenylene ether reaction liquid was continuously brought into contact with methanol under stirring to perform solidification and obtain a polyphenylene ether slurry solution. Wet pulverization of the slurry solution was carried out using a 1 mm lattice slit in a Disintegrator (product name) produced by Komatsu Zenoah Co. and solid-liquid separation of the pulverized slurry solution was carried out while continuously supplying the pulverized slurry solution into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried. The polyphenylene ether particles in the slurry solution after wet pulverization had a content of particles larger than 1,700 μm of 0 weight % and a weight average particle diameter of 220 μm.

The poly(2,6-dimethyl-1,4-phenylene ether) (PPE-1) obtained by the production method described above had a reduced viscosity of 0.38 dL/g, a number average molecular weight of 15,300, a number of terminal OH groups per 100 units of 0.72, and a number of dibutylamine terminals per 100 units of 0.43.

The reduced viscosity was measured by an Ubbelohde-type viscometer at 30° C. using a 0.5 g/dL chloroform solution.

(A-1-2) PPE-2

A 40 L jacketed polymerization tank equipped with a sparger for introduction of an oxygen-containing gas at the bottom of the polymerization tank, a stirring turbine impeller, and a baffle, and having a reflux condenser on a vent gas line at the top of the polymerization tank was charged with 4.57 g of cupric oxide, 24.18 g of 47 mass % hydrogen bromide aqueous solution, 11.00 g of di-t-butylethylenediamine, 62.72 g of di-n-butylamine, 149.92 g of butyldimethylamine, 20.65 kg of toluene, and 3.12 kg of 2,6-dimethylphenol while blowing nitrogen gas into the polymerization tank at a flow rate of 0.5 L/min. The contents of the polymerization tank were stirred until a homogeneous solution was obtained and the internal temperature of the polymerization tank was 25° C. Next, the sparger was used to start introducing dry air into the polymerization tank at a rate of 32.8 NL/min and polymerization was initiated. Passing of dry air was continued for 140 minutes and a polymerization mixture was obtained. The internal temperature during polymerization was controlled to 40° C. Passing of dry air was stopped and 10 kg of a 2.5 mass % aqueous solution of a tetrasodium salt of ethylenediaminetetraacetic acid (reagent produced by Dojindo Laboratories) was added to the polymerization mixture. The polymerization mixture was stirred for 150 minutes at 70° C. and was then left at rest for 20 minutes. Thereafter, the organic phase and the aqueous phase were separated by liquid-liquid separation.

The obtained organic phase was continuously brought into contact with methanol under stirring to perform solidification and obtain a polyphenylene ether slurry solution. Wet pulverization of the slurry solution was carried out using a 1 mm lattice slit in a Disintegrator (product name) produced by Komatsu Zenoah Co. and solid-liquid separation of the pulverized slurry solution was carried out while continuously supplying the pulverized slurry solution into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried. The polyphenylene ether particles in the slurry solution after wet pulverization had a content of particles larger than 1,700 μm of 0 weight % and a weight average particle diameter of 220 μm.

The poly(2,6-dimethyl-1,4-phenylene) ether (PPE-2) obtained as a precursor polyphenylene ether by the production method described above had a reduced viscosity of 0.38 dL/g, a number average molecular weight of 15,300, a number of terminal OH groups per 100 monomer units forming the precursor polyphenylene ether of 0.72, and a number of N,N-dibutylaminomethyl groups per 100 monomer units forming the polyphenylene ether of 0.43.

The reduced viscosity was measured by an Ubbelohde-type viscometer at 30° C. using a 0.5 g/dL chloroform solution.

(A-1-2) PPE-3

Modified polyphenylene ether produced by method in subsequently described Production Example 1

(A-1-3) PPE-4

Modified polyphenylene ether produced by method in subsequently described Production Example 2

(A-1-4) PPE-5

Modified polyphenylene ether produced by method in subsequently described Production Example 3

(A-1-5) PPE-6

Modified polyphenylene ether produced by method in subsequently described Production Example 4

(A-1-6) PPE-7

Modified polyphenylene ether produced by method in subsequently described Production Example 5

(A-1-7) PPE-8
Modified polyphenylene ether produced by method in subsequently described Production Example 6
(A-1-8) PPE-9
Modified polyphenylene ether produced by method in subsequently described Production Example 7
(A-1-9) PPE-10
Modified polyphenylene ether produced by method in subsequently described Production Example 8
(A-1-10) PPE-11
Modified polyphenylene ether produced by method in subsequently described Production Example 9
(A-1-11) PPE-12
Modified polyphenylene ether produced by method in subsequently described Production Example 10
(A-1-12) PPE-13
Modified polyphenylene ether produced by method in subsequently described Production Example 11
(A-1-13) PPE-14
Modified polyphenylene ether produced by method in subsequently described Production Example 12
(A-1-14) PPE-15
Modified polyphenylene ether produced by method in subsequently described Production Example 13
<(A-2) Other Thermoplastic Resins>
(A-2-1) Polystyrene (GPPS)
Polystyrene 685 produced by PS Japan Corporation
(A-2-2) Polyamide 6,6 (PA66)
Vydyne 48BX produced by Solutia Inc. (United States of America)
(A-2-3) Polypropylene (PP)
NOVATEC PP SA08 Polypropylene produced by Japan Polypropylene Corporation
<(A-c) Compatibilizing Agent>
(A-c-1) Maleic Anhydride (MAH)
Maleic anhydride produced by Mitsubishi Chemical Corporation
(A-c-2) Hydrogenated Block Copolymer (SEBS)
Polymer Synthesized by Following Method
A block copolymer having a B-A-B-A block structure in which polymer blocks A were formed from polystyrene and polymer blocks B were formed from polybutadiene was synthesized by a commonly known method. The synthesized block copolymer was then hydrogenated by a commonly known method. Modification of the polymer was not carried out. The resultant unmodified, hydrogenated block copolymer had the following physical properties.
Polystyrene content of block copolymer prior to hydrogenation: 44%
Number average molecular weight (Mn) of block copolymer prior to hydrogenation: 95,000
Number average molecular weight (Mn) of polystyrene blocks: 41,800
Number average molecular weight (Mn) of polybutadiene blocks: 53,200
Molecular weight distribution (Mw/Mn) of block copolymer prior to hydrogenation: 1.06
Total vinyl bond content (1,2-vinyl bond content) of polybutadiene blocks prior to hydrogenation: 75%
Hydrogenation rate of polybutadiene portion composing polybutadiene blocks: 99.9%
<(B) Flame Retardant>
(B-1) Condensed Phosphoric Acid Ester
Bisphenol A bis(diphenyl phosphate) (BDP) (product name: E890® (E890 is a registered trademark in Japan, other countries, or both); produced by Daihachi Chemical Industry Co., Ltd.)
(B-2) Phosphinic Acid Salt
Aluminum phosphinate (PA) (product name: Exolit OP1230® (Exolit OP1230 is a registered trademark in Japan, other countries, or both); produced by Clariant)
<(C) Antioxidant>
(C-1) Phosphoric Antioxidant 1
Chemical Name: 3,9-Bis(2,6-di-tert-butyl-4-methylphenoxy)-2,4,8,10-tetraoxa-3,9-diphosphaspiro[5,5]undecane (product name: ADK STAB PEP-36® (ADK STAB PEP-36 is a registered trademark in Japan, other countries, or both); produced by ADEKA Corporation)
(C-2) Phosphoric Antioxidant 2
Chemical name: Tris(2,4-di-tert-butylphenyl) phosphite (product name: Irgafos 168® (Irgafos 168 is a registered trademark in Japan, other countries, or both); produced by BASF)
The following describes an extrusion kneading method.
A twin screw extruder (ZSK-25 produced by Coperion GmbH) including a first raw material feeding inlet, a second raw material feeding inlet located roughly centrally in the extruder, and a liquid addition pump was used in the extrusion kneading. The (A) to (C) components described above were supplied from the first raw material feeding inlet, the second raw material feeding inlet, and the liquid addition position of the extruder in a composition indicated in Table 1 and were melt-kneaded to obtain a resin composition in the form of pellets.
Note that the twin screw extruder was set to a barrel temperature of 270° C. to 320° C. and a screw rotation speed of 300 rpm.
Physical properties of the resultant resin composition were measured as described below. The measurement results are shown in Table 1.
[Degree of Modification of PPE]
The content of structural units represented by formulae (1) to (4) in a modified PPE was calculated by $^{31}$P-NMR, $^{13}$C-NMR, and $^{1}$H-NMR.
The measurement conditions for NMR were as follows.
$^{31}$P-NMR measurement conditions
Device: JEOL RESONANCE ECS400
Observed nucleus: $^{31}$P
Observation frequency: 161.8 MHz
Pulse width: 45°
Wait time: 5 s
Cumulative number: 10,000
Solvent: $CDCl_3$
Sample concentration: 20 w/v %
Chemical shift standard: 85% phosphoric acid aqueous solution (external standard) 0 ppm
$^{13}$C-NMR measurement conditions
Device: Bruker Biospin Avance 600
Observed nucleus: $^{13}$C
Observation frequency: 150.9 MHz
Measurement method: Inverse gated decoupling
Pulse width: 30°
Wait time: 10 s
Cumulative number: 2,000
Solvent: $CDCl_3$
Sample concentration: 20 w/v %
Chemical shift standard: TMS 0 ppm
$^{1}$H-NMR measurement conditions
Device: JEOL ECA 500
Observed nucleus: $^{1}$H
Observation frequency: 500.16 MHz
Measurement method: Single-pulse
Pulse width: 7 μs
Wait time: 5 s Cumulative number: 512
Solvent: $CDCl_3$
Sample concentration: 5 w %
Chemical shift standard: TMS 0.00 ppm

[Ash Content]

The ash content of an obtained resin composition was determined by heating 2 g to 3 g of resin for 2 hours at 650° C. and calculating the ash content using the following equation.

Ash content (%)=$\Delta W \div W \times 100$ ($\Delta W$:weight of ash content, $W$:weight of sample)

In the present examples and comparative examples, the ash content was within a range of 0.1 mass % to 5.0 mass %.

[Rate of Change of Chloroform-Insoluble Content]

A shaped article of 12.6 cm in length, 1.3 cm in width, and 1.6 mm in thickness was prepared from an obtained resin composition. Thereafter, 1) a sample of 1 cm×1 cm×1.6 mm was cut from a bottom edge of the shaped article prior to aging, was frozen and pulverized, and was subsequently sieved in order to collect particles that passed through 500 µm openings but not through 355 µm openings. Next, 200 mg of the collected particles were weighed out and were ultrasonicated for 6 hours in 40 mL of chloroform. Soluble content and insoluble content were then separated by suction filtration. The resultant residue (insoluble content) was vacuum dried for 2 hours at 100° C. and the mass of the dried residue was measured. The measured value was taken to be the "initial amount of residue". Additionally, 2) a shaped article that had been subjected to aging in which the shaped article was left for 1,000 hours at 150° C. was processed by the same method as in 1) from cutting until drying, and then the mass of the resultant residue was measured. The measured value was taken to be the "post-aging amount of residue". The rate of change (%) of insoluble content was calculated from the values obtained in 1) and 2) using equation (X), shown below.

[Post-aging amount of residue (mg)–Initial amount of residue (mg)]/[200–Initial amount of residue (mg)]×100[%]  (X)

[Terminal OH Group Concentration in PPE]

Each extruded sample was dissolved in chloroform. Next, a liquid separation operation of the resultant solution and an equivalent amount of purified water was performed three times in a separating funnel to remove hydrophilic substances in the aqueous phase. The resultant organic phase was subjected to reprecipitation using methanol, and the precipitate was washed with methanol to remove antioxidant. Next, the precipitate was thoroughly washed with acetone to remove unreacted low molecular weight compounds. After filtration, the filtration residue was dried and 50° C. dichloromethane was gradually added to the filtration residue to achieve complete dissolution thereof. The solution was left overnight at an ambient temperature of 3° C. to perform recrystallization of only the PPE component. The resultant crystals were washed with 3° C. dichloromethane while being filtered to isolate the PPE component.

The PPE component isolated as described above was measured by $^{13}$C-NMR proton inverse gated decoupling (quantitative measurement) and the spectral ratio of 1-position carbons (146.1 ppm) bonded to terminal OH groups relative to 1-position carbons (145.4 ppm, 151.4 ppm) in side chains was calculated to determine the number of OH group terminals per 100 monomer units.

Obtained resin compositions were evaluated as described below in (1) and (2). The evaluation results are shown in Table 1.

(1) Flame Retardance

Resin composition pellets obtained in each example and comparative example were supplied into a screw inline type injection molding machine set to 290° C. and were injection molded at a mold temperature of 90° C. to form a test piece (2.0 mm in thickness) for measurement by a UL 94 vertical burning test. Five test pieces molded as described above were used to evaluate flame retardance based on the UL 94 vertical burning test. After a flame had been brought into contact with the test piece for 10 seconds, the flame was removed and the burn time until a flame on the test piece was extinguished was taken to be t1 (s). The flame was once again brought into contact with the test piece and was removed after 10 seconds. The burn time until a flame on the test piece was extinguished was taken to be t2 (s). An average burn time was determined from 10 values for t1 and t2 measured for the five test pieces.

(2) Long-Term Flame Retardance

Test pieces (2.0 mm in thickness) for measurement by a UL 94 vertical burning test that were obtained in the same way as described above for testing of flame retardance were hung in a 150° C. Geer oven using clips and were heat aged for 1,000 hours while being rotated such as to be uniformly heated. During the heat aging, the Geer oven had a damper aperture setting of 50%. After this heat aging, the test pieces were removed from the Geer oven and were evaluated for flame retardance based on a UL 94 vertical burning test, and t1 and t2 were measured. An average burn time was determined from 10 values for t1 and t2 that were measured.

The following describes production examples of modified polyphenylene ethers used in the examples and comparative examples.

Modified Polyphenylene Ether Production Example 1

A tumbler mixer was used to mix 100 parts by mass of PPE-1 and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (PPE-3). Thereafter, vacuum drying was carried out for 4 hours at 60° C. to obtain a powder of (A) the polyphenylene ether (PPE-3).

It was possible to identify (A-1) the polyphenylene ether (PPE-3) that was obtained by $^{31}$P-NMR (single pulse method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (10) and (11), shown below, that were included per 100 monomer units in the polyphenylene ether chain was 0.25.

Moreover, the added amount of reactive compound at terminal hydroxy groups could be determined by equation (2), shown below, using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (12), shown below, that were included per 100 monomer units forming the polyphenylene ether was 0.03. Moreover, it was confirmed that a new doublet peak did not arise at 3.5 ppm to 5.5 ppm in $^1$H-NMR.

Added amount of reactive compound (molecules) per 100 monomer units forming polyphenylene ether=(Number of terminal OH groups per 100 monomer units forming precursor polyphenylene ether)×{[A]/([A]+[B])} (2)

The ratio of chemical formula (10) relative to chemical formula (11) was determined to be 27 mol % by calculating an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

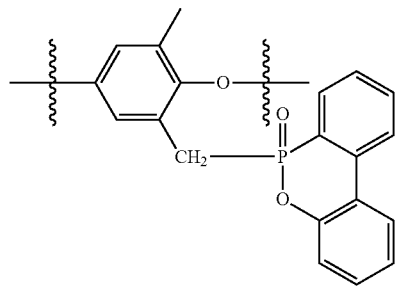

(10)

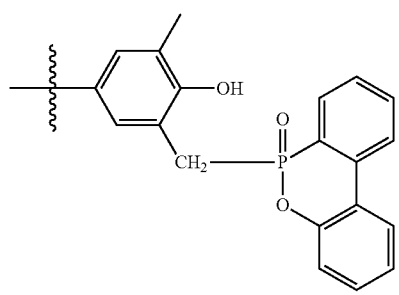

(11)

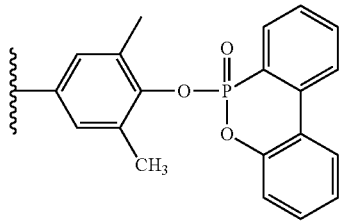

(12)

Modified Polyphenylene Ether Production Example 2

A tumbler mixer was used to mix 100 parts by mass of PPE-2 and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (PPE-4). Thereafter, vacuum drying was carried out for 4 hours at 60° C. to obtain a powder of (A) the polyphenylene ether (PPE-4).

It was possible to identify (A-1) the polyphenylene ether (PPE-4) that was obtained by $^{31}$P-NMR (single pulse method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (10) and (11), shown above, that were included per 100 monomer units in the polyphenylene ether chain was 0.25.

Moreover, the added amount of reactive compound at terminal hydroxy groups could be determined by equation (2), shown below, using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (12), shown above, that were included per 100 monomer units forming the polyphenylene ether was 0.03. Moreover, it was confirmed that a new doublet peak did not arise at 3.5 ppm to 5.5 ppm in $^1$H-NMR.

Added amount of reactive compound (molecules) per 100 monomer units forming polyphenylene ether=(Number of terminal OH groups per 100 monomer units forming precursor polyphenylene ether)×{[A]/([A]+[B])} (2)

The ratio of chemical formula (10) relative to chemical formula (11) was determined to be 27 mol % by calculating an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

Modified Polyphenylene Ether Production Example 3

First, a precursor polyphenylene ether was produced by the following production method.

A jacketed reactor having a capacity of 10 L and equipped with a stirrer, a thermometer, a condenser, and an oxygen supply tube that extended to the bottom of the reactor was charged with 2.9 kg of xylene, 905 g of methanol, and 1.0 kg (8.2 mol) of 2,6-dimethylphenol, and a homogeneous liquid was obtained therein. A solution of 26.2 g (655 mmol) of sodium hydroxide dissolved in 175 g of methanol was subsequently added, and then 20.8 g of a preliminary mixture obtained by mixing 810 mg (4.1 mmol) of manganese chloride tetrahydrate and 20 g (328 mmol) of monoethanolamine for 1 hour at 50° C. under a nitrogen atmosphere was added. In addition, 20.4 g (329 mmol) of ethylene glycol and 10.6 g (82 mmol) of di-n-butylamine were added. The contents of the reactor were vigorously stirred while blowing oxygen therein at a rate of 200 NmL/min and were caused to react for 3 hours while maintaining the reaction temperature at 40° C. Thereafter, the oxygen supply was changed to 80 NmL/min and the reaction temperature was lowered to 30° C. The supply of oxygen was stopped at the point at which 5 hours had passed from the start of the reaction. Next, 600 g of the reaction mixture was removed from the reactor and 280 g of methanol was added thereto. Precipitated polymer was collected by suction filtration and was then washed twice with 1 L of methanol and subjected to suction filtration. The resultant polymer was dispersed in a solution of 2.9 g of sodium pyrophosphate and 1.9 g of sodium hydrosulfite dissolved in 500 mL of deionized water and was treated for 10 minutes at 80° C. under stirring. Polymer obtained by suction filtration was then washed twice with 1 L of deionized water and subjected to suction filtration. The damp polymer was dried under reduced pressure for 5 hours at 150° C. to yield 110 g of a polyphenylene ether in the form of a powder.

A tumbler mixer was used to mix 100 parts by mass of the precursor polyphenylene ether (reduced viscosity: 0.47 dL/g; number of dibutylamine terminals per 100 units: 3.6) obtained by the production method described above and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A-1) a polyphenylene ether component (PPE-5). Thereafter, vacuum drying was carried out for 4 hours at 60° C. to obtain a powder of (A) the polyphenylene ether (PPE-5).

It was possible to identify (A) the polyphenylene ether (PPE-5) that was obtained by $^{31}$P-NMR (single pulse method) and $^1$H-NMR. The added amount of reactive compound was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures represented by chemical formulae (10) and (11), shown above, that were included per 100 monomer units in the polyphenylene ether chain was 3.4.

Moreover, the added amount of reactive compound at terminal hydroxy groups could be determined by equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (12) that were included per 100 monomer units forming the polyphenylene ether was 0.03. Moreover, it was confirmed that a new doublet peak did not arise at 3.5 ppm to 5.5 ppm in $^1$H-NMR.

The ratio of chemical formula (10) relative to chemical formula (11) was determined to be 5.0 mol % by calculating an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

Modified Polyphenylene Ether Production Example 4

First, a precursor polyphenylene ether was produced by the following production method.

A jacketed reactor having a capacity of 10 L and equipped with a stirrer, a thermometer, a condenser, and an oxygen supply tube that extended to the bottom of the reactor was charged with 2 g of cupric bromide that was then dissolved in 35 g of di-n-butylamine and 800 g of toluene. A solution of 200 g of 2,6-dimethylphenol dissolved in 500 g of toluene was added to the resultant catalyst solution. The mixed liquid of these solutions was caused to undergo polymerization for 1 hour at 40° C. in the reactor while oxygen was supplied thereto. After the reaction had been terminated, the reaction liquid was brought into contact with water and the catalyst was removed from the reaction liquid to obtain a polyphenylene ether reaction liquid. The polyphenylene ether reaction liquid was continuously brought into contact with methanol under stirring to perform solidification and obtain a polyphenylene ether slurry solution. Wet pulverization of the slurry solution was carried out using a 1 mm lattice slit in a Disintegrator (product name) produced by Komatsu Zenoah Co. and solid-liquid separation of the pulverized slurry solution was carried out while continuously supplying the pulverized slurry solution into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried. The polyphenylene ether particles in the slurry solution after wet pulverization had a content of particles larger than 1,700 μm of 0 weight % and a weight average particle diameter of 220 μm.

The poly(2,6-dimethyl-1,4-phenylene) ether obtained as a precursor polyphenylene ether by the production method described above had a reduced viscosity of 0.13 dL/g, a number average molecular weight of 3,000, and a number of terminal OH groups per 100 monomer units forming the precursor polyphenylene ether of 5.2.

A tumbler mixer was used to mix 100 parts by mass of the precursor polyphenylene ether and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (PPE-6). Thereafter, vacuum drying was carried out for 4 hours at 60° C. to obtain a powder of the polyphenylene ether (PPE-6).

It was possible to identify (A) the polyphenylene ether (PPE-6) that was obtained by $^{31}$P-NMR (single pulse method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures represented by chemical formulae (10) and (11), shown above, that were included per 100 monomer units in the polyphenylene ether chain was 0.25.

Moreover, the added amount of reactive compound at terminal hydroxy groups could be determined by equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (12) that were included per 100 monomer units forming the polyphenylene ether was 4.9. Moreover, it was confirmed that a new doublet peak did not arise at 3.5 ppm to 5.5 ppm in $^1$H-NMR.

The ratio of chemical formula (10) relative to chemical formula (11) was determined to be 27 mol % by calculating an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

Modified Polyphenylene Ether Production Example 5

First, a brominated polyphenylene ether was produced by the following production method.

A 10 L jacketed reactor was charged with 100 parts by mass of PPE-1, 2.0 L of chloroform was added, and stirring was performed at room temperature for 5 minutes under a nitrogen atmosphere. Thereafter, 15.0 parts by mass of N-bromosuccinimide and 2.0 parts by mass of azobisisobutyronitrile were added and a reaction was carried out for 8 hours under reflux. The resultant reaction liquid was cooled to room temperature, 3 L of n-hexane was subsequently added, and a brominated polyphenylene ether was solidified to yield a slurry. Wet pulverization of the slurry solution was carried out using a 1 mm lattice slit in a Disintegrator (product name) produced by Komatsu Zenoah Co. and solid-liquid separation of the pulverized slurry solution was carried out while continuously supplying the pulverized slurry solution into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried.

The brominated polyphenylene ether obtained by the production method described above had a number average molecular weight of 15,400. Only side chain methyl groups and terminal methyl groups were brominated with a bromination rate of 4.3 groups per 100 monomer units forming the polyphenylene ether.

A 10 L jacketed reactor was charged with 100 parts by mass of the brominated polyphenylene ether and 500 parts by mass of 9,10-dihydro-9-oxa-10-phosphaphenanthrene-10-oxide (produced by Sanko Co., Ltd.) and was stirred for 24 hours at 160° C. to carry out a reaction. The resultant reaction liquid was cooled to room temperature, 2 L of methanol was added, and the reacted material was solidified to yield a slurry. The slurry was filtered to obtain a powder that was then vacuum dried for 4 hours to yield a powder of a polyphenylene ether (PPE-7).

It was possible to identify (A) the polyphenylene ether (PPE-7) that was obtained by $^{31}$P-NMR (single pulse method) and $^{1}$H-NMR. The added amount of reactive compound at methyl groups was determined by dividing an integrated value for a peak appearing at 2.8 ppm to 3.6 ppm in $^{1}$H-NMR by an integrated value for a peak at 6.0 ppm to 7.0 ppm in $^{1}$H-NMR that originates from aromatic rings of the polyphenylene ether. It was confirmed that the total number of structures represented by chemical formulae (10) and (11), shown above, that were included per 100 monomer units in the polyphenylene ether chain was 4.0.

When the added amount of reactive compound at terminal hydroxy groups was measured by $^{13}$C-NMR as previously described, the structure of chemical formula (12) could not be confirmed.

The ratio of chemical formula (10) relative to chemical formula (11) was determined to be 570 mol % by calculating an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

Modified Polyphenylene Ether Production Example 6

A tumbler mixer was used to mix 100 parts by mass of PPE-1 and 1.5 parts by mass of dioctyl phosphonate (produced by Johoku Chemical Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A-1) a polyphenylene ether component (PPE-8). Thereafter, vacuum drying was carried out for 4 hours at 60° C. to obtain a powder of (A) the polyphenylene ether (PPE-8).

It was possible to identify (A-1) the polyphenylene ether (PPE-8) that was obtained by $^{31}$P-NMR (single pulse method) and $^{1}$H-NMR. The added amount of reactive compound was determined by dividing an integrated value for a peak appearing at 2.8 ppm to 3.6 ppm in $^{1}$H-NMR by an integrated value for a peak at 6.0 ppm to 7.0 ppm in $^{1}$H-NMR that originates from aromatic rings of the polyphenylene ether. It was confirmed that the total number of structures represented by chemical formulae (13) and (14) that were included per 100 monomer units in the polyphenylene ether was 0.25.

Moreover, the added amount of reactive compound at terminal hydroxy groups could be determined by equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (15) that were included per 100 monomer units forming the polyphenylene ether was 0.03. Moreover, it was confirmed that a new doublet peak did not arise at 3.5 ppm to 5.5 ppm in $^{1}$H-NMR.

The ratio of chemical formula (13) relative to chemical formula (14) was determined to be 25 mol % by calculating an integrated value for a peak at 32 ppm to 38 ppm in $^{31}$P-NMR that originates from chemical formula (13) relative to an integrated value for a peak at 38 ppm to 45 ppm in $^{31}$P-NMR that originates from chemical formula (14).

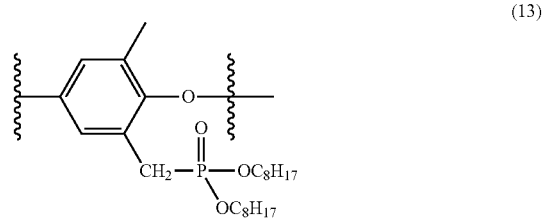

(13)

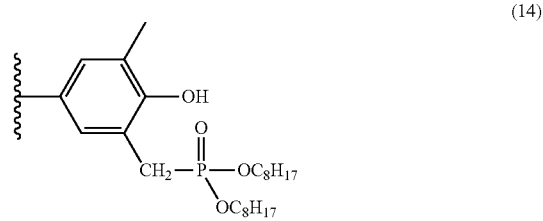

(14)

(15)

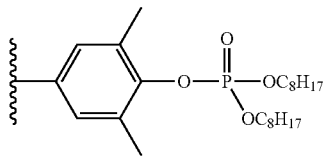

Modified Polyphenylene Ether Production Example 7

A tumbler mixer was used to mix 100 parts by mass of the precursor polyphenylene ether (PPE-1) and 1.5 parts by mass of diphenylphosphine oxide (produced by Tokyo Chemical Industry Co., Ltd.). The resultant powder mixture was fed from a first raw material feeding inlet of a twin screw extruder (ZSK-25 produced by Coperion GmbH) and was melt-kneaded at a barrel temperature of 300° C. and a screw rotation speed of 300 rpm to obtain a resin composition in the form of pellets.

The pellets were dissolved in chloroform and were then reprecipitated using methanol to extract a polyphenylene ether component (PPE-9). Thereafter, vacuum drying was carried out for 4 hours at 60° C. to obtain a powder of the polyphenylene ether (PPE-9).

It was possible to identify the polyphenylene ether (PPE-9) that was obtained by $^{31}$P-NMR (single pulse method) and $^{1}$H-NMR. The added amount of reactive compound was determined by dividing an integrated value for a peak appearing at 2.8 ppm to 3.6 ppm in $^{1}$H-NMR by an integrated value for a peak at 6.0 ppm to 7.0 ppm in $^{1}$H-NMR that originates from aromatic rings of the polyphenylene ether. It was confirmed that the total number of structures represented by chemical formulae (16) and (17) that were included per 100 monomer units in the polyphenylene ether was 0.25.

Moreover, the added amount of reactive compound at terminal hydroxy groups could be determined by equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (18), shown below, that were included per 100 monomer units forming the polyphenylene ether was 0.04. Moreover, it was confirmed that a new doublet peak did not arise at 3.5 ppm to 5.5 ppm in $^{1}$H-NMR.

The ratio of chemical formula (16) relative to chemical formula (17) was determined to be 25 mol % by calculating an integrated value for a peak at 32 ppm to 38 ppm in $^{31}$P-NMR that originates from chemical formula (16) relative to an integrated value for a peak at 38 ppm to 45 ppm in $^{31}$P-NMR that originates from chemical formula (17).

(16)

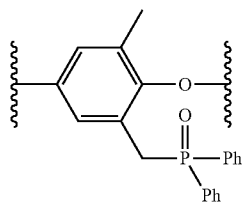

(17)

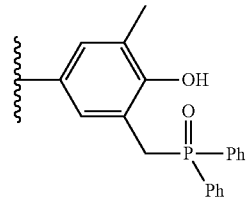

(18)

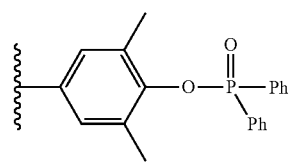

Modified Polyphenylene Ether Production Example 8

A solution was prepared by dissolving 100 parts by mass of PPE-1, 0.1 parts by mass of N-hydroxyphthalimide (produced by Tokyo Chemical Industry Co., Ltd.), 0.5 parts by mass of triethylamine (produced by Tokyo Chemical Industry Co., Ltd.), and 1.0 parts by mass of methanesulfonyl chloride (produced by Tokyo Chemical Industry Co., Ltd.) in 1 L of chloroform and was stirred for 5 hours at 60° C. The obtained reaction solution was neutralized with sodium hydrogen carbonate aqueous solution and was subjected to a liquid separation operation to obtain an organic layer. Methanol was gradually added to the obtained organic layer to cause precipitation of a PPE component that was then filtered off and dried to extract (A-1) a polyphenylene ether component (PPE-10). Thereafter, vacuum drying was carried out for 4 hours at 60° C. to obtain a powder of (A-1) the polyphenylene ether (PPE-10).

It was possible to identify (A-1) the polyphenylene ether (PPE-10) that was obtained by $^{1}$H-NMR and $^{13}$C-NMR. The added amount of reactive compound was determined by dividing an integrated value for a peak appearing at 2.8 ppm to 3.6 ppm in $^{1}$H-NMR by an integrated value for a peak at 6.0 ppm to 7.0 ppm in $^{1}$H-NMR that originates from aromatic rings of the polyphenylene ether. It was confirmed that the total number of structures represented by chemical formulae (23) and (24) that were included per 100 monomer units in the polyphenylene ether was 0.3.

Moreover, the added amount of reactive compound at terminal hydroxy groups could be determined by equation (2), shown above, using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (25), shown below, that were included per 100 monomer units forming the polyphenylene ether was 0.1. Moreover, it was confirmed that a new doublet peak did not arise at 3.5 ppm to 5.5 ppm in $^{1}$H-NMR.

The ratio of chemical formula (23) relative to chemical formula (24) was determined to be 20 mol % by calculating a ratio of an integrated value for a peak at 34 ppm to 36 ppm in $^{31}$P-NMR that originates from chemical formula (23) relative to an integrated value for a peak at 38 ppm to 42 ppm in $^{31}$P-NMR that originates from chemical formula (24).

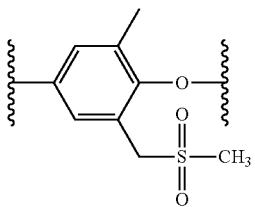
(23)

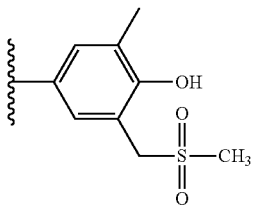
(24)

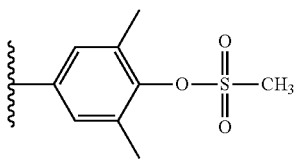
(25)

Modified Polyphenylene Ether Production Example 9

PPE-1 was fed from a first raw material feeding inlet of a twin screw extruder (ZSK-25 produced by Coperion GmbH), was melt-kneaded with a barrel temperature of 300° C. and a screw rotation speed of 300 rpm, and was pelletized. The obtained PPE pellets were analyzed to confirm a structure in which dibutylamine had been eliminated. A tumbler mixer was used to mix 100 parts by mass of these PPE pellets and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract a polyphenylene ether component (PPE-11). Thereafter, vacuum drying was carried out for 4 hours at 60° C. to obtain a powder of the polyphenylene ether (PPE-11).

As a result of identification of the obtained polyphenylene ether (PPE-11) by $^1$H-NMR, it was confirmed that the polyphenylene ether (PPE-11) was formed from structures of chemical formulae (26) and (27) without addition of low molecular weight compound at methyl groups in the monomer units.

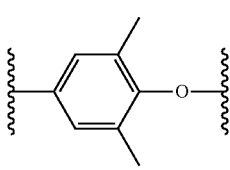
(26)

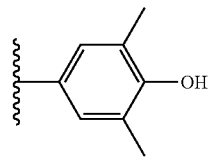
(27)

Modified Polyphenylene Ether Production Example 10

A tumbler mixer was used to mix 100 parts by mass of PPE-1 and 1.6 parts by mass of stearyl acrylate (produced by Tokyo Chemical Industry Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

These pellets were dissolved in chloroform. Thereafter, purified water was added, an organic layer and an aqueous layer were separated by a liquid separation operation, and the organic layer was collected. A PPE component was reprecipitated from the organic layer using methanol to extract the polyphenylene ether component (PPE-12). Thereafter, vacuum drying was carried out for 4 hours at 60° C. to obtain a powder of PPE-12.

It was possible to identify PPE-12 that was obtained by $^1$H-NMR. It was confirmed that the number of structures represented by chemical formula (28) that were included per 100 monomer units in the polyphenylene ether was 0.4 by dividing an integrated value for a peak appearing at 2.5 ppm to 4.0 ppm in $^1$H-NMR by an integrated value for a peak at 6.0 ppm to 7.0 ppm in $^1$H-NMR that originates from aromatic rings in the polyphenylene ether.

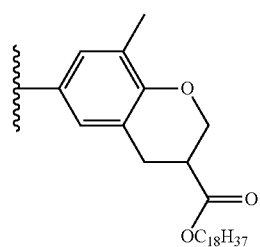
(28)

Modified Polyphenylene Ether Production Example 11

A tumbler mixer was used to mix 100 parts by mass of PPE-1 and 10 parts by mass of styrene. The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

These pellets were dissolved in chloroform and were then reprecipitated using methanol to extract a polyphenylene ether component. Thereafter, vacuum drying was carried out for 4 hours at 60° C. to obtain a powder of PPE-13.

It was possible to identify PPE-13 that was obtained by $^1$H-NMR. It was confirmed that the number of structures represented by chemical formula (29) that were included per 100 monomer units in the polyphenylene ether was 0.4 by dividing an integrated value for a peak appearing at 2.5 ppm to 4.0 ppm in $^1$H-NMR by an integrated value for a peak at 6.0 ppm to 7.0 ppm in $^1$H-NMR that originates from aromatic rings in the polyphenylene ether.

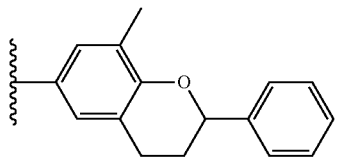

(29)

Modified Polyphenylene Ether Production Example 12

A tumbler mixer was used to mix 100 parts by mass of PPE-1 and 5.0 parts by mass of maleic anhydride. The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract a modified polyphenylene ether component. Thereafter, vacuum drying was carried out for 4 hours at 60° C. to obtain a powder of PPE-14.

It was possible to identify PPE-14 that was obtained by $^1$H-NMR. It was confirmed that the number of structures represented by chemical formula (30) that were included per 100 monomer units in the polyphenylene ether was 0.3 by dividing an integrated value for a peak appearing at 2.5 ppm to 4.0 ppm in $^1$H-NMR by an integrated value for a peak at 6.0 ppm to 7.0 ppm in $^1$H-NMR that originates from aromatic rings in the polyphenylene ether.

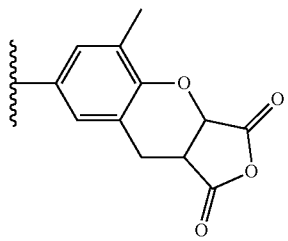

(30)

Modified Polyphenylene Ether Production Example 13

A tumbler mixer was used to mix 100 parts by mass of the precursor polyphenylene ether (PPE-1) and 1.5 parts by mass of dioleyl hydrogen phosphite (produced by Johoku Chemical Co., Ltd.). The resultant powder mixture was fed from a first raw material feeding inlet of a twin screw extruder (ZSK-25 produced by Coperion GmbH) and was melt-kneaded at a barrel temperature of 300° C. and a screw rotation speed of 300 rpm to obtain a resin composition in the form of pellets.

The pellets were dissolved in chloroform and were then reprecipitated using methanol to extract a polyphenylene ether component (PPE-15). Thereafter, vacuum drying was carried out for 4 hours at 60° C. to obtain a powder of the polyphenylene ether (PPE-15).

It was possible to identify the polyphenylene ether (PPE-15) that was obtained by $^{31}$P-NMR (single pulse method), $^{13}$C-NMR, and MALDI-TOF/MS. The added amount of reactive compound could be determined by equation (2), shown above, using an integrated value [A] for a peak at 146.3 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures represented by chemical formula (31), shown below, that were included per 100 monomer units forming the polyphenylene ether was 0.03. An olefin doublet peak that originates from an oleyl group was confirmed at 4.2 ppm in $^1$H-NMR.

Note that measurement by $^{31}$P-NMR, $^{13}$C-NMR, MALDI-TOF/MS, and $^1$H-NMR was performed with the same conditions as previously described.

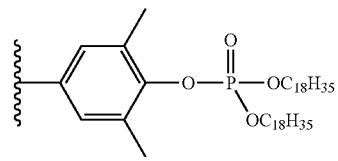

(31)

Details pertaining to the conditions, measurement results, and evaluation results in Examples A1 to A4, which are comparable to the first aspect, Examples B1 to B17, which are comparable to the second aspect, and Comparative Examples 1 to 10 are shown in Table 1.

TABLE 1

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| First raw material feeding inlet | PPE | A-1-1 PPE-1 | Parts by mass | 70 | 70 | 70 | 70 | 70 | | | | | |
| | | A-1-2 PPE-3 | Parts by mass | | | | | | | | | | |
| | | A-1-3 PPE-4 | Parts by mass | | | | | | | | | | |
| | | A-1-4 PPE-5 | Parts by mass | | | | | | | | | | |
| | | A-1-5 PPE-6 | Parts by mass | | | | | | | | | | |
| | | A-1-6 PPE-7 | Parts by mass | | | | | | | | | | |
| | | A-1-7 PPE-8 | Parts by mass | | | | | | | | | | |
| | | A-1-8 PPE-9 | Parts by mass | | | | | | | | | | |
| | | A-1-9 PPE-10 | Parts by mass | | | | | | | | | | |
| | | A-1-10 PPE-11 | Parts by mass | | | | | | 70 | | | | |
| | | A-1-11 PPE-12 | Parts by mass | | | | | | | 70 | | | |
| | | A-1-12 PPE-13 | Parts by mass | | | | | | | | 70 | | |
| | | A-1-13 PPE-14 | Parts by mass | | | | | | | | | 70 | |
| | | A-1-14 PPE-15 | Parts by mass | | | | | | | | | | 70 |
| | Other thermoplastic resins | A-2-1 GPPS | Parts by mass | 30 | 30 | 30 | | | | | | | |
| | | A-2-3 PP | Parts by mass | | | | | 10 | 30 | 30 | 30 | 30 | 30 |
| | Antioxidant | C-1 PEP-36 | Parts by mass | | | 1.0 | 1.0 | 1.0 | | | | | |
| | | C-2 Irgafos 168 | Parts by mass | | | | | | | | | | |
| | Compatibilizing agent | A-c-1 MAH | Parts by mass | | | | 0.1 | | | | | | |
| | | A-c-2 SEBS | Parts by mass | | | | | 10 | | | | | |
| | Flame retardant | B-2 Al phosphinate | Parts by mass | | | | 4 | 5 | | | | | |
| Second raw material feeding inlet | Other thermoplastic resins | A-2-2 PA | Parts by mass | | | | 30 | | | | | | |
| | | A-2-3 PP | Parts by mass | | | | | 20 | | | | | |
| Liquid addition pump | Flame retardant | B-1 BDP | Parts by mass | 10 | 20 | 10 | | 5 | 10 | 10 | 10 | 10 | 10 |
| Measurement results | Rate of change of insoluble content after 1,000 hr aging at 150° C. | | % | 39 | 31 | 20 | 24 | 26 | 45 | 20 | 19 | 25 | 30 |
| | Terminal OH group concentration | | Groups per 100 units | 1.5 | 1.3 | 1.5 | 1.9 | 1.9 | 1.7 | 0.5 | 0.6 | 0.5 | 0.5 |
| Evaluation results | Flame retardance (UL 94, 2.0 mm) Average burn time | | s | 2.6 | 1.5 | 3.0 | 4.0 | 4.5 | 3.2 | 2.2 | 2.1 | 2.4 | 1.5 |
| | Long-term flame retardance (after 1,000 hr aging at 150° C.) (UL 94, 2.0 mm) Average burn time | | s | 28.5 | 15.0 | 16.8 | 20.1 | 19.5 | 34.0 | 25.0 | 24.0 | 26.0 | 20.0 |

| | | | Example A1 | Example A2 | Example A3 | Example A4 | Example B1 | Example B2 | Example B3 | Example B4 | Example B5 | Example B6 |
|---|---|---|---|---|---|---|---|---|---|---|---|---|
| First raw material feeding inlet | PPE | A-1-1 PPE-1 | Parts by mass | 70 | 70 | 70 | 70 | 70 | 70 | | | | |
| | | A-1-2 PPE-3 | Parts by mass | | | | | | | 70 | | | |
| | | A-1-3 PPE-4 | Parts by mass | | | | | | | | 70 | | |
| | | A-1-4 PPE-5 | Parts by mass | | | | | | | | | 70 | |
| | | A-1-5 PPE-6 | Parts by mass | | | | | | | | | | 70 |
| | | A-1-6 PPE-7 | Parts by mass | | | | | | | | | | |
| | | A-1-7 PPE-8 | Parts by mass | | | | | | | | | | |

TABLE 1-continued

| | | Unit | Example B7 | Example B8 | Example B9 | Example B10 | Example B11 | Example B12 | Example B13 | Example B14 | Example B15 | Example B16 | Example B17 |
|---|---|---|---|---|---|---|---|---|---|---|---|---|---|
| | A-1-8 PPE-9 | Parts by mass | | | | | | | | | | | |
| | A-1-9 PPE-10 | Parts by mass | | | | | | | | | | | |
| | A-1-10 PPE-11 | Parts by mass | | | | | | | | | | | |
| | A-1-11 PPE-12 | Parts by mass | | | | | | | | | | | |
| | A-1-12 PPE-13 | Parts by mass | | | | | | | | | | | |
| | A-1-13 PPE-14 | Parts by mass | | | | | | | | | | | |
| | A-1-14 PPE-15 | Parts by mass | | | | | | | | | | | |
| Other thermoplastic resins | A-2-1 GPPS | Parts by mass | 30 | 30 | 30 | | 30 | | 15 | 30 | 30 | 30 | 30 |
| | A-2-3 PP | Parts by mass | | | | | | | | | | | |
| Antioxidant | C-1 PEP-36 | Parts by mass | 5.0 | 10.0 | | 15.0 | | | | | | | |
| | C-2 Irgafos 168 | Parts by mass | | | 10.0 | | | | | | | | |
| Compatibilizing agent | A-c-1 MAH | Parts by mass | | | | | | 0.1 | | | | | |
| | A-c-2 SEBS | Parts by mass | | | | | | 4 | 10 | | | | |
| Flame retardant | B-2 Al phosphinate | Parts by mass | | | | | | | 5 | | | | |
| Second raw material feeding inlet — Other thermoplastic resins | A-2-2 PA | Parts by mass | | | | | | 30 | | | | | |
| | A-2-3 PP | Parts by mass | | | | | | | 15 | | | | |
| Liquid addition pump — Flame retardant | B-1 BDP | Parts by mass | 10 | 10 | 10 | 10 | 10 | 10 | 5 | 10 | 10 | 10 | 10 |
| Measurement results | Rate of change of insoluble content after 1,000 hr aging at 150° C. | % | 14 | 7 | 8 | 6 | 12 | 14 | 14 | 12 | 8 | | 13 |
| | Terminal OH group concentration Per 100 | Groups units | 1.4 | 1.4 | 1.5 | 1.4 | 0.7 | 0.6 | 0.6 | 0.7 | 0.5 | | 0.3 |
| Evaluation results | Flame retardance Average burn time (UL 94, 2.0 mm) | s | 8.0 | 7.8 | 8.2 | 6.4 | 3.2 | 4.2 | 4.0 | 3.2 | 4.8 | | 4.0 |
| | Long-term flame retardance Average burn time (after 1,000 hr aging at 150° C.) (UL 94, 2.0 mm) | s | 7.8 | 5.3 | 4.1 | 4.0 | 6.4 | 7.2 | 7.5 | 6.4 | 5.2 | | 6.0 |
| First raw material feeding inlet | PPE | Parts by mass | | | | | 70 | 80 | 65 | | | 70 | 70 |
| | A-1-1 PPE-1 | | | | | | | | | | | | |
| | A-1-2 PPE-3 | | | | | | | | | | | | |
| | A-1-3 PPE-4 | | | | | | | | | | | | |
| | A-1-4 PPE-5 | | | | | | | | | | | | |
| | A-1-5 PPE-6 | | | | | | | | | | | | |

TABLE 1-continued

| | | | | | | | | | | | | |
|---|---|---|---|---|---|---|---|---|---|---|---|---|
| | A-1-6 | PPE-7 | Parts by mass | 70 | | | | | | | | |
| | A-1-7 | PPE-8 | Parts by mass | | 70 | | | | | | | |
| | A-1-8 | PPE-9 | Parts by mass | | | 70 | | | | | | |
| | A-1-9 | PPE-10 | Parts by mass | | | | 70 | | | | | |
| | A-1-10 | PPE-11 | Parts by mass | | | | | | | 70 | | |
| | A-1-11 | PPE-12 | Parts by mass | | | | | | 70 | | | |
| | A-1-12 | PPE-13 | Parts by mass | | | | | | | | 70 | |
| | A-1-13 | PPE-14 | Parts by mass | | | | | | | | | 15 |
| | A-1-14 | PPE-15 | Parts by mass | | | | | | | | | 1.0 |
| Other thermoplastic resins | A-2-1 | GPPS | Parts by mass | 30 | 30 | 30 | 30 | 20 | 35 | 30 | 30 | |
| Antioxidant | C-1 | PP | Parts by mass | | | | | | | | | |
| | C-2 | PEP-36 | Parts by mass | | | | | | | | | 10 |
| | | Irgafos 168 | Parts by mass | 1.0 | 1.0 | 1.0 | 1.0 | 1.0 | 1.0 | 1.0 | 1.0 | 5 |
| Compatibilizing agent | A-c-1 | MAH | Parts by mass | | | | | | | | 0.1 | |
| | A-c-2 | SEBS | Parts by mass | | | | | | | | 4 | |
| Flame retardant | B-2 | Al phosphinate | Parts by mass | | | | | | | | | 15 |
| Second raw material feeding inlet | A-2-2 | PA | Parts by mass | | | | | | | | 30 | 5 |
| | A-2-3 | PP | Parts by mass | | | | | | | | | 10 |
| Liquid addition pump | B-1 | BDP | Parts by mass | 10 | 10 | 10 | 10 | 10 | 9 | 10 | 10 | |
| Measurement results | Rate of change of insoluble content after 1,000 hr aging at 150° C. | | % | 15 | 13 | 13 | 11 | 9 | 8 | 11 | 12 | 0.5 |
| | Terminal OH group concentration | | Per 100 units | 1.5 | 0.6 | 0.7 | 1.4 | 0.6 | 0.6 | 1.2 | 1.4 | 0.5 |
| Evaluation results | Flame retardance (UL 94, 2.0 mm) | | Average burn time | 1.5 | 3.5 | 4.0 | 7.2 | 3.1 | 2.6 | 3.0 | 4.6 | 3.9 |
| | Long-term flame retardance (after 1,000 hr aging at 150° C.) (UL 94, 2.0 mm) | | Average burn time s | 11.0 | 7.0 | 6.8 | 8.0 | 5.4 | 7.9 | 4.6 | 7.0 | 6.2 |

INDUSTRIAL APPLICABILITY

According to this disclosure, it is possible to achieve a polyphenylene ether flame-retardant resin composition that has excellent flame retardance and long-term flame retardance while maintaining high heat resistance and to provide a thermoplastic resin shaped article that can be adopted as an electric/electronic component, an automotive component, or the like that is required to have high heat aging resistance.

The invention claimed is:

1. A flame-retardant resin composition comprising:
   (A) a resin including (A-1) a polyphenylene ether; and
   (B) a flame retardant, wherein
   (A-1) the polyphenylene ether includes at least one structural unit selected from chemical formulae (1) and (2),

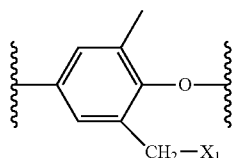
(1)

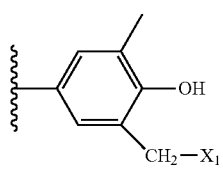
(2)

$X_1$ in chemical formulae (1) and (2) is a group selected from

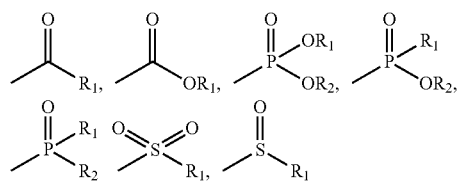

where $R_1$ and $R_2$ in $X_1$ are each, independently of one another, a substituent having a carbon number of 1 or more,
   the (A-1) component has a content of 50 mass % or more when the flame-retardant resin composition minus ash content, corresponding to a residue obtained upon burning of the flame-retardant resin composition, is taken to be 100 mass %, and
   a shaped article of 12.6 cm in length, 1.3 cm in width, and 1.6 mm in thickness that is formed from the flame-retardant resin composition exhibits a rate of change of chloroform-insoluble content of 15 mass % or less through aging in which the shaped article is left for 1,000 hours at 150° C. in an atmospheric air.

2. The flame-retardant resin composition according to claim 1, wherein
   a ratio of structural units represented by chemical formula (1) relative to structural units represented by chemical formula (2) is 0 mol % to 30 mol %.

3. The flame-retardant resin composition according to claim 1, wherein
   (A-1) the polyphenylene ether includes a structural unit represented by chemical formula (3) and either or both of a structural unit represented by chemical formula (1) and a structural unit represented by chemical formula (2),

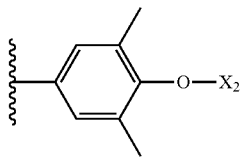
(3)

$X_2$ in chemical formula (3) is a group selected from the group consisting of

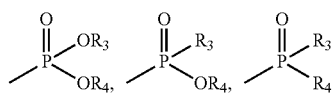

where $R_3$ and $R_4$ in $X_2$ are each, independently of one another, a group selected from the group consisting of a hydrogen atom, an alkyl group, an aryl group, an aminoalkyl group, and an arylamino group, $R_3$ and $R_4$ may form a cyclic structure through bonding of carbon atoms included therein, and chemical formula (3) does not substantially include an unsaturated double bond other than an aromatic ring unsaturated double bond.

4. The flame-retardant resin composition according to claim 1, wherein
   (A-1) the polyphenylene ether has a number average molecular weight of 10,000 or more.

5. The flame-retardant resin composition according to claim 1, wherein
   0.1 structural units to 10.0 structural units selected from the group consisting of chemical formulae (1) and (2) are included per 100 monomer units forming (A-1) the polyphenylene ether.

6. The flame-retardant resin composition according to claim 5, wherein
   a ratio of structural units represented by chemical formula (1) relative to structural units represented by chemical formula (2) is 0 mol % to 30 mol %.

7. The flame-retardant resin composition according to claim 1, further comprising (C) an antioxidant, wherein
   the (C) component has a content of 0.1 parts by mass to 5.0 parts by mass when (A) the resin is taken to be 100 parts by mass.

8. The flame-retardant resin composition according to claim 7, wherein
   (C) the antioxidant includes a phosphoric antioxidant.

9. The flame-retardant resin composition according to claim 1, wherein
   in (A-1) the polyphenylene ether, $X_1$ is a group selected from the group consisting of

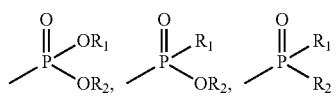

in chemical formulae (1) and (2).

10. The flame-retardant resin composition according to claim 9, wherein 0.1 structural units to 10.0 structural units selected from the group consisting of chemical formulae (1) and (2) are included per 100 monomer units forming (A-1) the polyphenylene ether.

11. The flame-retardant resin composition according to claim 9, wherein
a ratio of structural units represented by chemical formula (1) relative to structural units represented by chemical formula (2) is 0 mol % to 30 mol %.

12. A flame-retardant resin composition comprising:
(A) a resin including (A-1) a polyphenylene ether; and
(B) a flame retardant, wherein
the (A-1) component has a content of 50 mass % or more when the flame-retardant resin composition minus ash content, corresponding to a residue obtained upon burning of the flame-retardant resin composition, is taken to be 100 mass %, and
(A-1) the polyphenylene ether includes at least one structural unit selected from chemical formulae (1) and (2), (1)
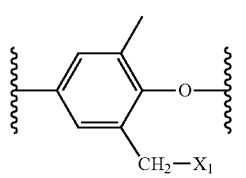

(2)
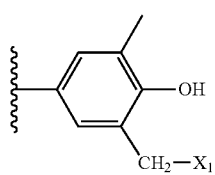

$X_1$ in chemical formulae (1) and (2) is a group selected from

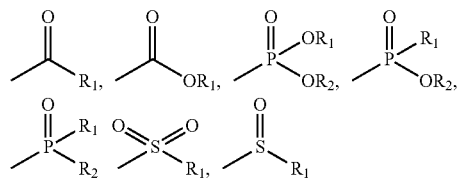

where $R_1$ and $R_2$ in $X_1$ are each, independently of one another, a substituent having a carbon number of 1 or more.

13. The flame-retardant resin composition according to claim 12, wherein
in (A-1) the polyphenylene ether, $X_1$ is a group selected from the group consisting of

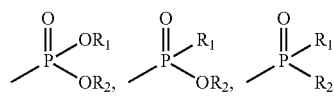

in chemical formulae (1) and (2).

14. The flame-retardant resin composition according to claim 12, wherein
0.1 structural units to 10.0 structural units selected from the group consisting of chemical formulae (1) and (2) are included per 100 monomer units forming (A-1) the polyphenylene ether.

15. The flame-retardant resin composition according to claim 12, wherein
a ratio of structural units represented by chemical formula (1) relative to structural units represented by chemical formula (2) is 0 mol % to 30 mol %.

16. The flame-retardant resin composition according to claim 12, wherein
(A-1) the polyphenylene ether includes a structural unit represented by chemical formula (3) and either or both of a structural unit represented by chemical formula (1) and a structural unit represented by chemical formula (2), (3)
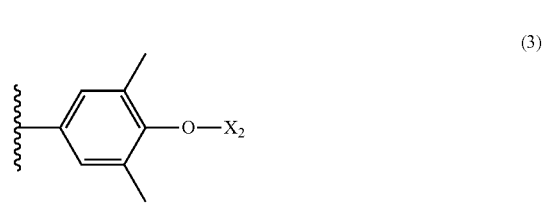

$X_2$ in chemical formula (3) is a group selected from the group consisting of

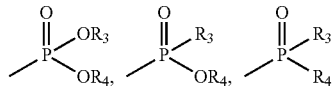

where $R_3$ and $R_4$ in $X_2$ are each, independently of one another, a group selected from the group consisting of a hydrogen atom, an alkyl group, an aryl group, an aminoalkyl group, and an arylamino group, $R_3$ and $R_4$ may form a cyclic structure through bonding of carbon atoms included therein, and chemical formula (3) does not substantially include an unsaturated double bond other than an aromatic ring unsaturated double bond.

17. The flame-retardant resin composition according to claim 12, further comprising (C) an antioxidant, wherein
the (C) component has a content of 0.1 parts by mass to 5.0 parts by mass when (A) the resin is taken to be 100 parts by mass.

18. The flame-retardant resin composition according to claim 12, wherein
(C) the antioxidant includes a phosphoric antioxidant.

19. The flame-retardant resin composition according to claim 12, wherein
(A-1) the polyphenylene ether has a number average molecular weight of 10,000 or more.

* * * * *